United States Patent
Rokkan et al.

(10) Patent No.: US 9,791,583 B2
(45) Date of Patent: *Oct. 17, 2017

(54) OVERBOARD SYSTEM FOR DEPLOYMENT AND RETRIEVAL OF AUTONOMOUS SEISMIC NODES

(71) Applicant: Seabed Geosolutions B.V., Leidschendam (NL)

(72) Inventors: Arne Henning Rokkan, Olsvik (NO); Richard Edward Henman, Horsham (GB); Leif Johan Larsen, Alversund (NO); Johan Fredrik Naes, Trondheim (NO); Mariann Ervik, Trondheim (NO); Ole-Fredrik Semb, Tolvsrod (NO)

(73) Assignee: Seabed Geosolutions B.V., Leidschendam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/227,411

(22) Filed: Aug. 3, 2016

(65) Prior Publication Data

US 2016/0341840 A1    Nov. 24, 2016

Related U.S. Application Data

(63) Continuation of application No. 14/820,285, filed on Aug. 6, 2015, now Pat. No. 9,429,671.
(Continued)

(51) Int. Cl.
*B63B 35/04* (2006.01)
*G01V 1/38* (2006.01)

(52) U.S. Cl.
CPC ............ *G01V 1/3852* (2013.01); *B63B 35/04* (2013.01); *G01V 1/3843* (2013.01)

(58) Field of Classification Search
CPC ...... G01V 1/3843; G01V 1/3852; G01V 1/38; F16L 1/20; F16L 1/207; F16L 1/235; B63B 35/04
See application file for complete search history.

(56) References Cited

U.S. PATENT DOCUMENTS

| 4,566,083 A | 1/1986 | Thigpen |
| 5,284,323 A | 2/1994 | Pawkett |

(Continued)

FOREIGN PATENT DOCUMENTS

| EP | 1876472 A2 | 1/2008 |
| EP | 1870733 A3 | 9/2009 |

(Continued)

*Primary Examiner* — Frederick L Lagman
(74) *Attorney, Agent, or Firm* — Park, Vaughan, Fleming & Dowler LLP; Shane A. Nelson

(57) ABSTRACT

Embodiments of systems and methods for deploying and retrieving a plurality of autonomous seismic nodes from the back deck of a marine vessel using an overboard node deployment and retrieval system are presented. The overboard system may comprise one or more overboard wheels that are actively powered to move in response to changes in movement of the deployed cable. The overboard system may comprise a first overboard wheel with a plurality of rollers and a second overboard wheel configured to detect movement and/or changes in a position of the deployment line. The overboard system may be configured to move the first overboard wheel in response to movement of the second overboard wheel. In addition, the first overboard wheel may comprise at least one opening or pocket configured to hold a node while the node passes across the wheel. Other seismic devices may also pass through the overboard system, such as transponders and weights attached to the deployment cable.

38 Claims, 14 Drawing Sheets

Related U.S. Application Data

(60) Provisional application No. 62/034,620, filed on Aug. 7, 2014.

(56) References Cited

U.S. PATENT DOCUMENTS

| | | | |
|---|---|---|---|
| 5,682,357 A | 10/1997 | Rigsby | |
| 5,902,072 A | 5/1999 | Berges | |
| 6,024,344 A | 2/2000 | Buckley | |
| 6,044,786 A | 4/2000 | Dudley | |
| 6,082,710 A | 7/2000 | Dragsund | |
| 6,657,921 B1 | 12/2003 | Ambs | |
| 6,975,560 B2 | 12/2005 | Berg | |
| 7,254,093 B2 | 8/2007 | Ray | |
| 7,260,024 B2 | 8/2007 | Goujon | |
| 7,286,442 B2 | 10/2007 | Ray et al. | |
| 7,310,287 B2 | 12/2007 | Ray | |
| 7,561,493 B2 | 7/2009 | Ray | |
| 7,602,667 B2 | 10/2009 | Thompson | |
| 7,646,670 B2 | 1/2010 | Maxwell | |
| 7,649,803 B2 | 1/2010 | Thompson | |
| 7,668,047 B2 | 2/2010 | Ray | |
| 7,724,607 B2 | 5/2010 | Ray | |
| 7,778,114 B2 | 8/2010 | Goujon | |
| 7,804,737 B2 | 9/2010 | Thompson | |
| 7,883,292 B2 | 2/2011 | Thompson | |
| 7,913,944 B1 | 3/2011 | Lombardi | |
| 7,929,378 B2 | 4/2011 | Gros | |
| 7,933,165 B2 | 4/2011 | Thompson | |
| 7,986,589 B2 | 7/2011 | Ray | |
| 7,990,803 B2 | 8/2011 | Ray | |
| 8,021,080 B2 | 9/2011 | Frivik | |
| 8,050,140 B2 | 11/2011 | Ray | |
| 8,087,848 B2 | 1/2012 | Thompson | |
| 8,127,706 B2 | 3/2012 | Thompson | |
| 8,149,647 B2 | 4/2012 | Borgen | |
| 8,172,480 B2 | 5/2012 | Thompson | |
| 8,226,328 B2 | 7/2012 | Thompson | |
| 8,228,761 B2 | 7/2012 | Ray | |
| 8,328,467 B2 | 12/2012 | Thompson | |
| 8,427,900 B2 | 4/2013 | Fleure | |
| 8,619,495 B2 | 12/2013 | Thompson | |
| 8,675,446 B2 | 3/2014 | Gateman | |
| 8,801,328 B2 | 8/2014 | Thompson | |
| 8,864,416 B2 | 10/2014 | Thompson | |
| 8,879,362 B2 | 11/2014 | Ray | |
| 8,942,059 B2 | 1/2015 | Furuhaug | |
| 9,170,344 B2 | 10/2015 | Lindberg | |
| 9,429,671 B2 * | 8/2016 | Rokkan | B63B 35/04 |
| 2002/0056777 A1 | 5/2002 | Lindeman | |
| 2005/0087731 A1 | 4/2005 | Scott | |
| 2008/0080318 A1 * | 4/2008 | Maxwell | G01V 1/16 367/131 |
| 2008/0267009 A1 | 10/2008 | Frivik | |
| 2012/0218865 A1 | 8/2012 | Dinter | |
| 2013/0058192 A1 | 3/2013 | Gateman | |
| 2013/0183100 A1 | 7/2013 | Olivier | |
| 2013/0189036 A1 | 7/2013 | Oldervoll | |
| 2014/0185410 A1 | 7/2014 | Voldsbekk | |
| 2014/0185411 A1 | 7/2014 | Voldsbekk | |
| 2014/0198607 A1 | 7/2014 | Etienne | |
| 2015/0331130 A1 * | 11/2015 | Henman | G01V 1/3843 405/158 |

FOREIGN PATENT DOCUMENTS

| | | | |
|---|---|---|---|
| FR | 2293355 A1 | 7/1976 | |
| FR | 2572048 A1 | 4/1986 | |
| WO | 2005074426 A2 | 8/2005 | |
| WO | 2006/041438 A1 | 4/2006 | |
| WO | WO 2011089479 A1 * | 7/2011 | B63B 35/04 |
| WO | 2011/139159 A1 | 11/2011 | |
| WO | 2014/027892 A1 | 2/2014 | |
| WO | 2014/084741 A1 | 6/2014 | |
| WO | 2014185787 A1 | 11/2014 | |

* cited by examiner

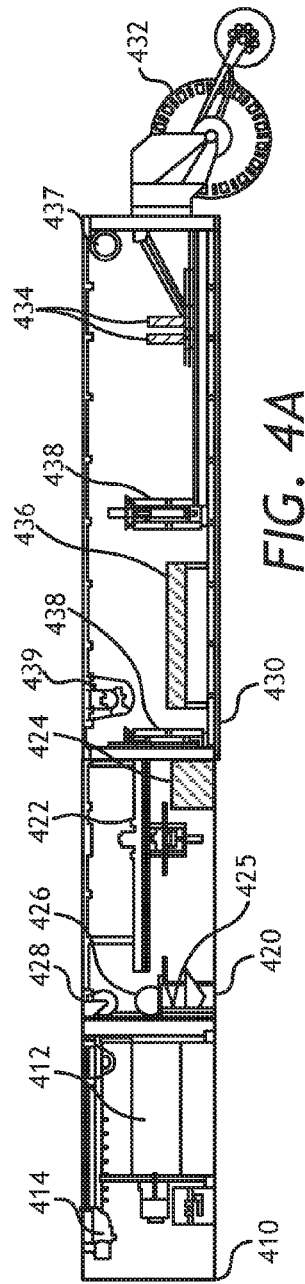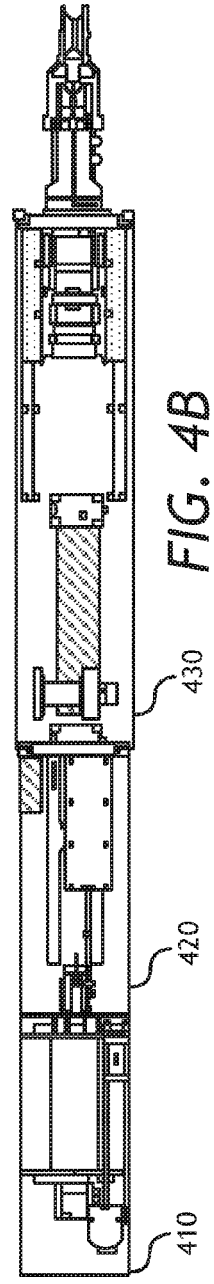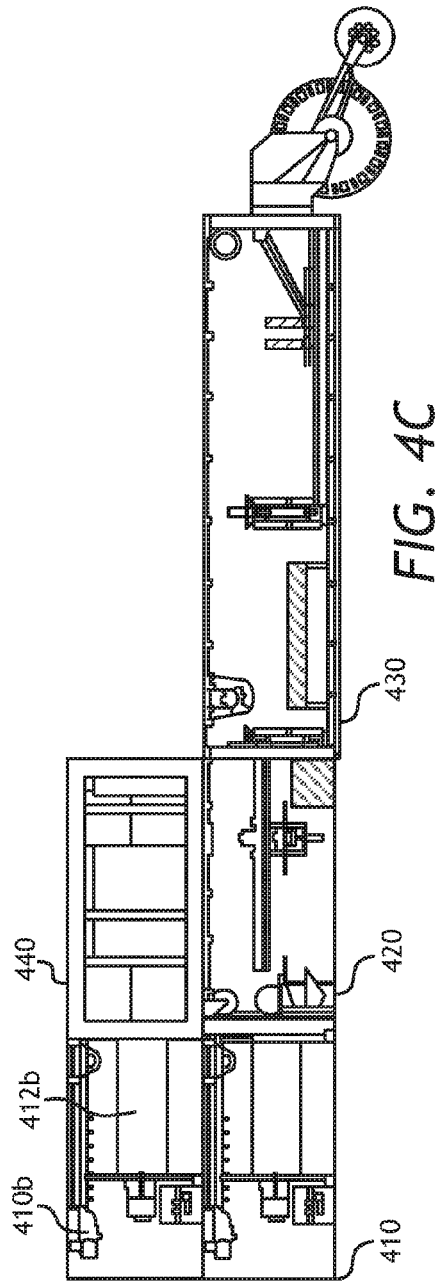

OVERBOARD SYSTEM FOR DEPLOYMENT AND RETRIEVAL OF AUTONOMOUS SEISMIC NODES

PRIORITY

The present application is a continuation of U.S. application Ser. No. 14/820,285, filed on Aug. 6, 2015, issued as U.S. Pat. No. 9,429,671, which claims priority to U.S. provisional patent application No. 62/034,620, filed on Aug. 7, 2014. The entire contents of each of the above documents is hereby incorporated herein by reference.

BACKGROUND OF THE INVENTION

Field of the Invention

This invention relates to marine seismic systems and more particularly relates to the deployment and retrieval of autonomous seismic nodes over the back deck of a marine vessel using an overboard wheel.

Description of the Related Art

Marine seismic data acquisition and processing generates a profile (image) of a geophysical structure under the seafloor. Reflection seismology is a method of geophysical exploration to determine the properties of the Earth's sub-surface, which is especially helpful in determining an accurate location of oil and gas reservoirs or any targeted features. Marine reflection seismology is based on using a controlled source of energy (typically acoustic energy) that sends the energy through seawater and subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

In general, either ocean bottom cables (OBC) or ocean bottom nodes (OBN) are placed on the seabed. For OBC systems, a cable is placed on the seabed by a surface vessel and may include a large number of seismic sensors, typically connected every 25 or 50 meters into the cable. The cable provides support to the sensors, and acts as a transmission medium for power to the sensors and data received from the sensors. One such commercial system is offered by Sercel under the name SeaRay®. Regarding OBN systems, and as compared to seismic streamers and OBC systems, OBN systems have nodes that are discrete, autonomous units (no direct connection to other nodes or to the marine vessel) where data is stored and recorded during a seismic survey. One such OBN system is offered by the Applicant under the name Trilobit®. For OBN systems, seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel.

Autonomous ocean bottom nodes are independent seismometers, and in a typical application they are self-contained units comprising a housing, frame, skeleton, or shell that includes various internal components such as geophone and hydrophone sensors, a data recording unit, a reference clock for time synchronization, and a power source. The power sources are typically battery-powered, and in some instances the batteries are rechargeable. In operation, the nodes remain on the seafloor for an extended period of time. Once the data recorders are retrieved, the data is downloaded and batteries may be replaced or recharged in preparation of the next deployment One known node storage, deployment, and retrieval system is disclosed in U.S. Pat. No. 7,883,292 to Thompson, et al. ("Thompson '292"), and is incorporated herein by reference. Thompson et al. discloses a method and apparatus for storing, deploying and retrieving a plurality of seismic devices, and discloses attaching the node to the deployment line by using a rope, tether, chain, or other cable such as a lanyard that is tied or otherwise fastened to each node and to a node attachment point on the deployment line. U.S. Pat. No. 7,990,803 to Ray et al. ("Ray") discloses a method for attaching an ocean bottom node to a deployment cable and deploying that node into the water. U.S. Pat. No. 6,024,344 to Buckley, et al. ("Buckley") also involves attaching seismic nodes to the deployment line. Buckley teaches that each node may be connected to a wire that is then connected to the deployment line though a separate connector. This connecting wire approach is cumbersome because the wires can get tangled or knotted, and the seismic nodes and related wiring can become snagged or tangled with structures or debris in the water or on the sea floor or on the marine vessel. U.S. Pat. No. 8,427,900 to Fleure, et al. ("Fleure") and U.S. Pat. No. 8,675,446 to Gateman, et al. ("Gateman") each disclose a deployment line with integral node casings or housings for receiving seismic nodes or data recorders. One problem with integration of the casings with the deployment line is that the deployment line becomes difficult to manage and store. The integrated casings make the line difficult to wind onto spools or otherwise store manageably. In these embodiments, the node casings remain attached directly in-line with the cable, and therefore, this is a difficult and complex operation to separate the electronics sensor package from the node casings. The use of pre-mounted node casings on the deployment line or pre-cut connecting ropes/wires between the node and the deployment line do not allow for a flexible change in adjacent node spacing/distance; any change of node spacing requires a significant amount of cost and time.

The referenced shortcomings are not intended to be exhaustive, but rather are among many that tend to impair the effectiveness of previously known techniques in seafloor deployment systems; however, those mentioned here are sufficient to demonstrate that the methodologies appearing in the art have not been satisfactory and that a significant need exists for the systems, apparatuses, and techniques described and claimed in this disclosure.

The existing techniques for attaching an autonomous node to a cable and deploying that cable overboard a marine vessel suffer from many disadvantages. As an example, attaching a node to a rope that is coupled to the deployment line often gets tangled during deployment and/or retrieval to the seabed. The spiraling of the tether cable can also cause problems during the retrieval when separating the node from the cable. Existing overboard chutes, ramps, and wheels also suffer from many disadvantages. First, existing overboard units have a hard time tracking movement of the cable and the cable often slips off of the overboard unit during cable deployment and retrieval. Second, while some overboard wheels may have a wheel coupled to a counterweight for passive movement, they are not active and/or powered to move, thus lacking the necessary responsiveness to changes in the movement of a deployed cable. Conventional overboard units are not able to actively change their position (such as by rotating or pivoting) when the cable moves relative to the overboard unit. This is particularly problematic in deep water applications, bad weather/sea conditions, changes in vessel direction, speed, or angle, as well movements caused by a vessel roll or changes in crab-angle. Still further, conventional overboard units are not able to deploy and retrieve nodes without causing stress and/or damage (or the potential of damage) to any attached nodes, particularly to nodes with node locks that directly attach a node to a cable. A marine vessel should be configured to efficiently deploy and recover nodes before and after their use in the water. A novel node deployment system is needed that is autonomous, limits the need for operator involvement, handling, and attaching/detaching of the nodes, and is very fast and efficient.

SUMMARY OF THE INVENTION

Embodiments of systems and methods for deploying and retrieving a plurality of autonomous seismic nodes from the back deck of a marine vessel using an overboard node deployment and retrieval system.

In one embodiment, the system may comprise a first overboard wheel that is powered to actively change its position during deployment of a plurality of seismic nodes. The first overboard wheel may be coupled to a second overboard wheel. The first overboard wheel may be configured to move its position (including by rotating and pivoting) in response to movement by the second overboard wheel and/or the deployed cable. The first overboard wheel may comprise a plurality of rollers and one or more pockets configured to receive a node over the first overboard wheel during deployment and retrieval operations. Other seismic devices may also pass through the overboard system, such as transponders and weights attached to the deployment cable. The first overboard wheel may be coupled to a control system for automatic control of its movement in response to one or more measurement sensors.

In one embodiment, a method comprises deploying a deployment line across a powered overboard unit, positioning the overboard unit to receive a first node of a plurality of seismic nodes, and deploying the first node into a body of water. The method may further comprise detecting movement by a second overboard wheel and/or the deployed cable and changing the position of the overboard unit in response to such movement. The method may further comprise retrieving a plurality of deployed autonomous seismic nodes across the first overboard wheel.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 4A illustrates a side view of one embodiment of a deployment system.

FIG. 4B illustrates a top view of one embodiment of a deployment system.

FIG. 4C illustrates a side view of another embodiment of a deployment system.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Node Deployment

Figure 1A:
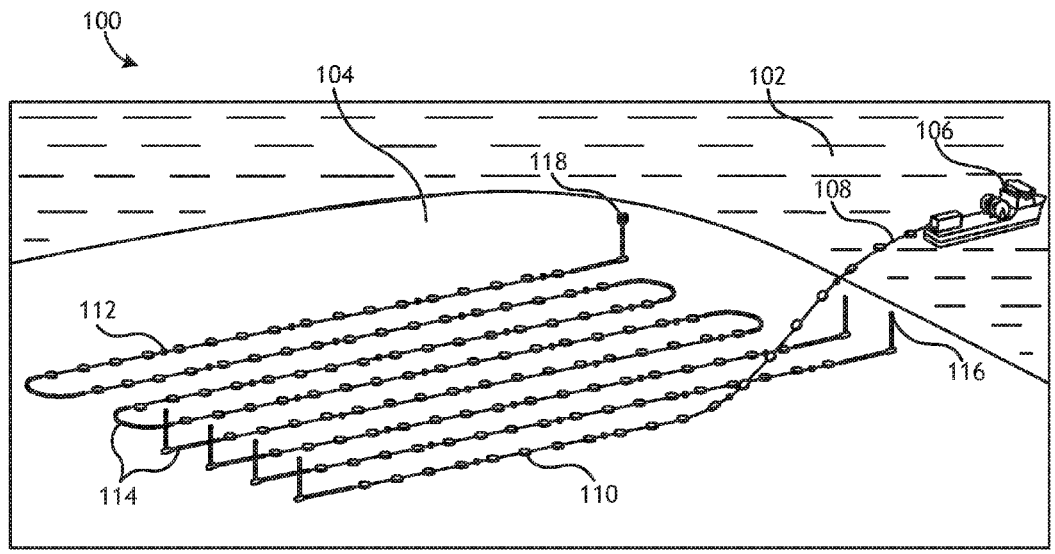
FIG. 1A is a schematic diagram illustrating one embodiment of a system for marine deployment of an autonomous seismic node.
Figure 1B:
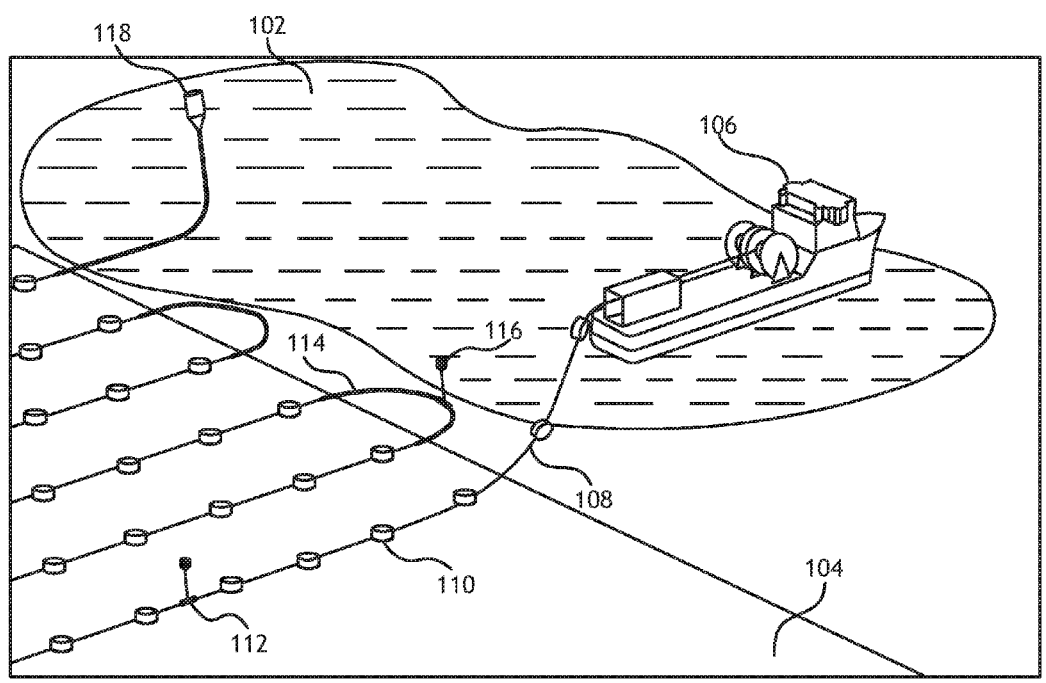
FIG. 1B is a schematic diagram illustrating one embodiment of a system for marine deployment of an autonomous seismic node.

FIGS. 1A and 1B illustrate a layout of a seabed seismic recorder system that may be used with autonomous seismic nodes for marine deployment. FIG. 1A is a diagram illustrating one embodiment of a marine deployment system 100 for marine deployment of seismic nodes 110. One or more marine vessels deploy and recover a cable (or rope) with attached sensor nodes according to a particular survey pattern. In an embodiment, the system includes a marine vessel 106 designed to float on a surface 102 of a body of water, which may be a river, lake, ocean, or any other body of water. The marine vessel 106 may deploy the seismic nodes 110 in the body of water or on the floor 104 of the body of water, such as a seabed. In an embodiment, the marine vessel 106 may include one or more deployment lines 108. One or more seismic nodes 110 may be attached directly to the deployment line 108. Additionally, the marine deployment system 100 may include one or more acoustic positioning transponders 112, one or more weights 114, one or more pop up buoys 116, and one or more surface buoys 118. As is standard in the art, weights 114 can be used at various positions of the cable to facilitate the lowering and positioning of the cable, and surface buoys 118 or pop up buoys 116 may be used on the cable to locate, retrieve, and/or raise various portions of the cable. Acoustic positioning transponders 112 may also be used selectively on various portions of the cable to determine the positions of the cable/sensors during deployment and post deployment. The acoustic positioning transponders 112 may transmit on request an acoustic signal to the marine vessel for indicating the positioning of seismic nodes 110 on sea floor 104. In an embodiment, weights 114 may be coupled to deployment line 108 and be arranged to keep the seismic nodes 110 in a specific position relative to sea floor 104 at various points, such as during start, stop, and snaking of deployment line 108.

FIG. 1B is a close-up view illustrating one embodiment of a system 100 for marine deployment of seismic nodes 110. In an embodiment, the deployment line 108 may be a metal cable (steel, galvanized steel, or stainless steel). Alternatively, the deployment line 108 may include chain linkage, rope (polymer), wire, or any other suitable material for tethering to the marine vessel 106 and deploying one or more seismic nodes 110. In an embodiment, the deployment line 108 and the seismic nodes 110 may be stored on the marine vessel 106. For example, the deployment line may be stored on a spool or reel or winch. The seismic nodes 110 may be stored in one or more storage containers. One of ordinary skill may recognize alternative methods for storing and deploying the deployment line 108 and the seismic nodes 110.

In one embodiment, the deployment line 108 and seismic nodes 110 are stored on marine vessel 106 and deployed from a back deck of the vessel 106, although other deployment locations from the vessel can be used. As is well known in the art, a deployment line 108, such as a rope or cable, with a weight attached to its free end is dropped from the back deck of the vessel. The seismic nodes 110 are preferably directly attached in-line to the deployment line 108 at a regular, variable, or selectable interval (such as 25 meters) while the deployment line 108 is lowered through the water column and draped linearly or at varied spacing onto the seabed. During recovery each seismic node 110 may be clipped off the deployment line 108 as it reaches deck level of the vessel 106. Preferably, nodes 110 are attached directly onto the deployment line 108 in an automated process using node attachment or coupling machines on board the deck of the marine vessel 106 at one or more workstations or containers. Likewise, a node detaching or decoupling machine is configured to detach or otherwise disengage the seismic nodes 110 from the deployment line 108, and in some instances may use a detachment tool for such detaching. Alternatively, seismic nodes 110 can be attached via manual or semi-automatic methods. The seismic nodes 110 can be attached to the deployment line 108 in a variety of configurations, which allows for proper rotation of the seismic node 110 about the deployment line 108 and allows for minimal axial movement on deployment line 108. For example, the deployment line 108 can be attached to the top, side, or center of seismic node 110 via a variety of configurations.

Once the deployment line 108 and the seismic nodes 110 are deployed on the sea floor 104, a seismic survey can be performed. One or more marine vessels 106 may contain a seismic energy source (not shown) and transmit acoustic signals to the sea floor 104 for data acquisition by the seismic nodes 110. Embodiments of the system 100 may be deployed in both coastal and offshore waters in various depths of water. For example, the system may be deployed in a few meters of water or in up to several thousand meters of water. In some embodiments, the depth may be between twenty (20) meters and five hundred (500) meters or more. In some configurations surface buoy 118 or pop up buoy 116 may be retrieved by marine vessel 106 when the seismic nodes 110 are to be retrieved from the sea floor 104. Thus, the system 110 may not require retrieval by means of a submersible or diver. Rather, pop up buoy 116 or surface buoy 118 may be picked up on the surface 102 and deployment line 108 may be retrieved along with seismic nodes 110.

Autonomous Seismic Node Design

Figure 2A:
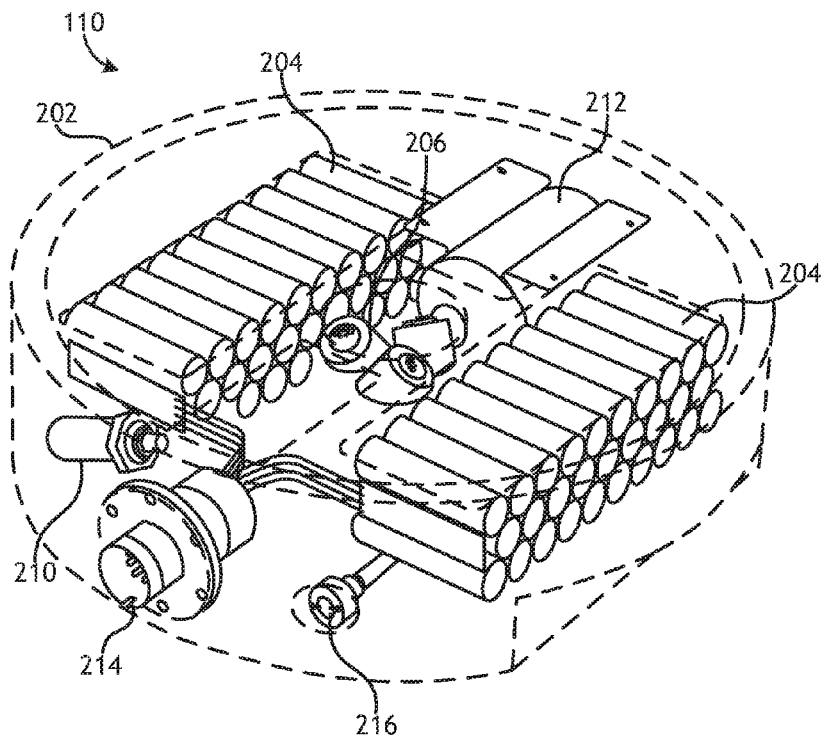
FIG. 2A illustrates a perspective view diagram of one embodiment of an autonomous seismic node.

FIG. 2A illustrates a perspective view diagram of an autonomous ocean bottom seismic node 110. The seismic node 110 may include a body 202, such as a housing, frame, skeleton, or shell, which may be easily dissembled into various components. Additionally, the seismic node 110 may include one or more battery cells 204. In an embodiment, the battery cells 204 may be lithium-ion battery cells or rechargeable battery packs for an extended endurance (such as 90 days) on the seabed, but one of ordinary skill will recognize that a variety of alternative battery cell types or configurations may also be used. Additionally, the seismic node may include a pressure release valve 216 configured to release unwanted pressure from the seismic node 110 at a pre-set level. The valve protects against fault conditions like water intrusion and outgassing from a battery package. Additionally, the seismic node may include an electrical connector 214 configured to allow external access to information stored by internal electrical components, data communication, and power transfer. During the deployment the connector is covered by a pressure proof watertight cap 218 (shown in FIG. 2B). In other embodiments, the node does not have an external connector and data is transferred to and from the node wirelessly, such as via electromagnetic or optical links.

In an embodiment, the internal electrical components may include one or more hydrophones 210, one or more (preferably three) geophones 206 or accelerometers, and a data recorder 212. In an embodiment, the data recorder 212 may be a digital autonomous recorder configured to store digital data generated by the sensors or data receivers, such as hydrophone 210 and the one or more geophones or accelerometers 206. One of ordinary skill will recognize that more or fewer components may be included in the seismic node 110. For example, there are a variety of sensors that can be incorporated into the node including and not exclusively, inclinometers, rotation sensors, translation sensors, heading sensors, and magnetometers. Except for the hydrophone, these components are preferably contained within the node housing that is resistant to temperatures and pressures at the bottom of the ocean, as is well known in the art.

Figure 2B:
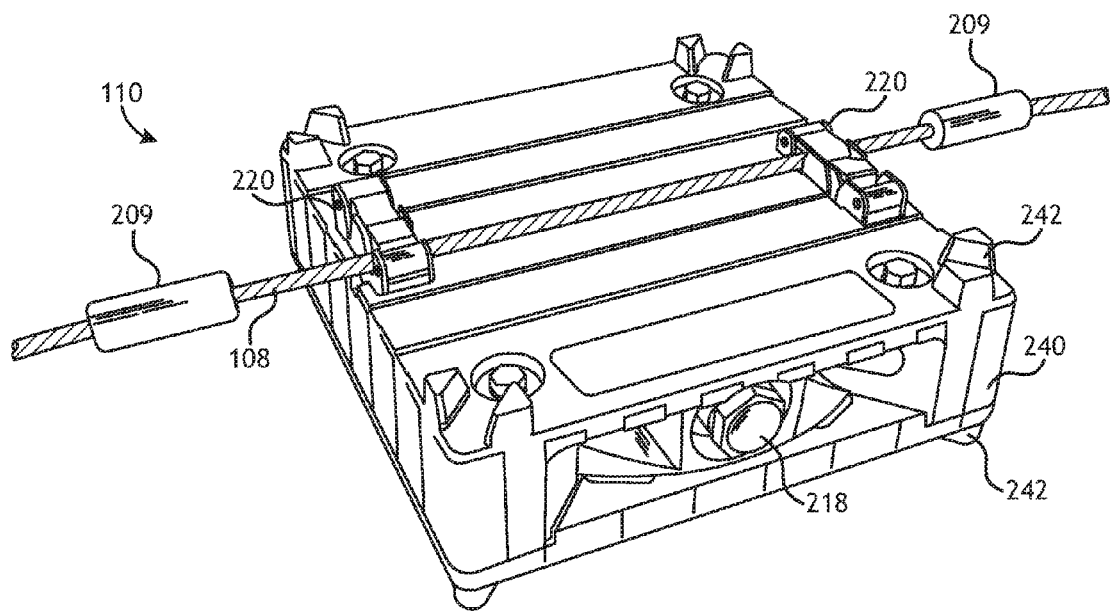
FIG. 2B illustrates a perspective view diagram of another embodiment of an autonomous seismic node.

While the node in FIG. 2A is circular in shape, the node can be any variety of geometric configurations, including square, rectangular, hexagonal, octagonal, cylindrical, and spherical, among other designs, and may or may not be symmetrical about its central axis. In one embodiment, the node consists of a watertight, sealed case or pressure housing that contains all of the node's internal components. In one embodiment, the node is square or substantially square shaped so as to be substantially a quadrilateral, as shown in FIG. 2B. One of skill in the art will recognize that such a node is not a two-dimensional object, but includes a height, and in one embodiment may be considered a box, cube, elongated cube, or cuboid. In one embodiment, the node is approximately 350 mm×350 mm wide/deep with a height of approximately 150 mm. In one embodiment, the body 202 of the node has a height of approximately 100 mm and other coupling features, such as node locks 220 or protrusions 242, may provide an additional 20-50 mm or more height to the node.

In another embodiment, as shown in FIG. 2B, the node's pressure housing may be coupled to and/or substantially surrounded by an external non-pressurized node housing 240 that may include integrated fenders and/or bumpers. Various portions of the node housing 240 may be open and expose the pressurized node housing as needed, such as for hydrophone 210, node locks 220, and data/power transfer connection 214 (shown with a fitted pressure cap 218 in FIG. 2B). In one embodiment, the upper and lower portions of the fender housing include a plurality of gripping teeth or protrusions 242 for engaging the seabed and for general storage and handling needs. In other embodiments, a bumper is attached to each of the corners of the node housing via bolts or pins. In another embodiment, portions of the housing, such as the corners, include grooved pockets or recesses or receptacles that engage a corresponding mating unit on the node housing for integrated stacking/storing of the nodes. External node housing 240 provides many functions, such as protecting the node from shocks and rough treatment, coupling the node to the seabed for better readings and stability, and assisting in the stackability, storing, alignment, and handling of the nodes. Each node housing may be made of a durable material such as rubber, plastic, carbon fiber, or metal. In still other embodiments, the seismic node 110 may include a protective shell or bumper configured to protect the body.

Node Locks

In one embodiment, the seismic node 110 comprises one or more direct attachment mechanisms and/or node locks 220 that may be configured to directly attach the seismic node 110 to a deployment line 108. This may be referred to as direct or in-line node coupling. In one embodiment, the attachment mechanism 220 comprises a locking mechanism to help secure or retain the deployment line 108 to the seismic node 110. A plurality of direct attachment mechanisms may be located on any surfaces of the node 110 or node housing 240. In one embodiment, a plurality of node locks 220 is positioned substantially in the center and/or middle of a surface of a node or node housing. The node locks may attach directly to the pressure housing and extend through the node housing 240. In this embodiment, a deployment line, when coupled to the plurality of node locks, is substantially coupled to the seismic node on its center axis. In some embodiments, the node locks may be offset or partially offset from the center axis of the node, which may aid the balance and handling of the node during deployment and retrieval. The node locks 220 are configured to attach, couple, and/or engage a portion of the deployment line to the node. Thus, a plurality of node locks 220 operates to couple a plurality of portions of the deployment line to the node. The node locks are configured to keep the deployment line fastened to the node during a seismic survey, such as during deployment from a vessel until the node reaches the seabed, during recording of seismic data while on the seabed, and during retrieval of the node from the seabed to a recovery vessel. The disclosed attachment mechanism 220 may be moved from an open and/or unlocked position to a closed and/or locked position via autonomous, semi-autonomous, or manual methods. In one embodiment, the components of node lock 220 are made of titanium, stainless steel, aluminum, marine bronze, and/or other substantially inert and non-corrosive materials.

As shown in FIG. 2B, two node locks 220 are positioned substantially in the middle top face of the node. The node locks may be asymmetrical and oriented in opposing and/or offset orientations for better stability when deploying and retrieving the node from the seabed and for manufacturing/assembly purposes. Node locks may be configured in a positively open and/or a positively closed position, depending on the type of coupling/decoupling machines used. In some embodiments, a spring mechanism is used to bias the node lock in a closed and/or open position, and in other embodiments other biasing members may be used, such as a flexible plate, a torsion spring, or other bendable/twistable biasing members, as well as offset travel paths for the deployment wire causing it to act as a spring due to its in-line stiffness. A ferrule or other stopping mechanism 209 may be located on either side of the node on the deployment line, which helps prevent movement of the node on the deployment line, facilitates attaching/detaching of the node from the line, and facilitates seismic acoustic decoupling between the deployment line and the node. In other embodiments, ferrules and other stoppers can be used as a single stop between adjacent nodes (e.g., only one ferrule between each node), a plurality of redundant stoppers can be used between each node, or a double stopper and swivel type arrangement can be used between each node. A ferrule or stopper may limit the movement of the node by many configurations, such as by a sliding attachment point where the node slides between the stoppers, or the stopper may slide inside a cavity of the node and act as a sliding cavity stopper. The position of the stopper(s) on the deployment line and the coupling of the node to the deployment line is configured for acoustic decoupling between the node and the deployment line. In one embodiment, the distance between adjacent ferrules is greater than the width of the node, which facilitates the node to be seismically de-coupled from the wire/rope of the deployment line. In some embodiments, each node lock acts as a swivel to allow rotation of the node around the deployment line.

Node Deployment and Retrieval System

Figure 3:
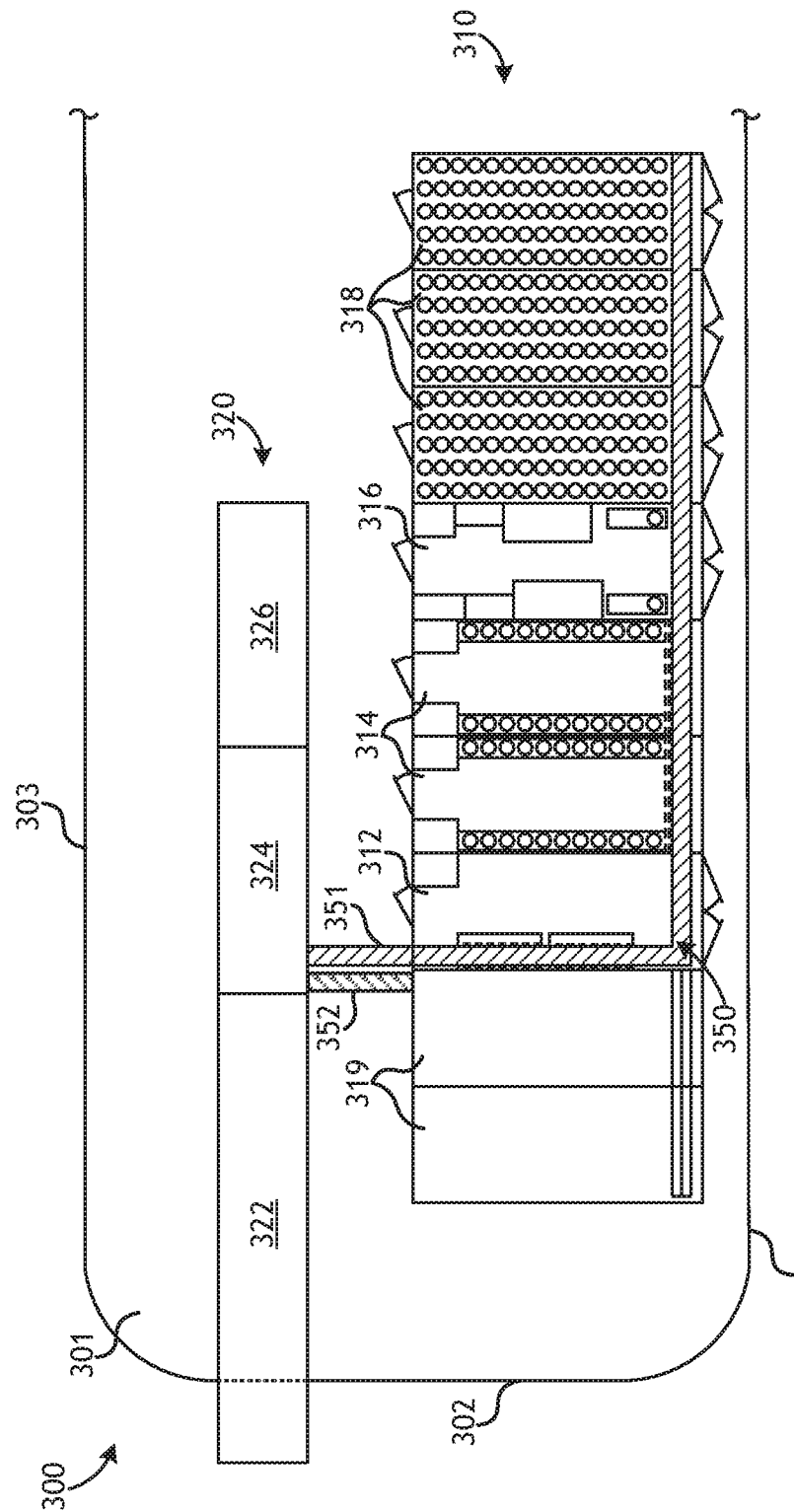
FIG. 3 is a schematic diagram illustrating one embodiment of a node deployment system and a node storage and service system on the back deck of a marine vessel.

As mentioned above, to perform a seismic survey that utilizes autonomous seismic nodes, those nodes must be deployed and retrieved from a vessel, typically a surface vessel. FIG. 3 illustrates a schematic of one embodiment of a deck handling system 300 of a surface vessel. While the deck handling system may be located on any portion of the vessel, in one embodiment it is located on the back deck of a marine vessel. Of relevance to FIG. 3, the vessel 301 comprises a back, end, or aft section 302 and two sides 303. For convenience purposes, the rest of the marine vessel is not shown in FIG. 3. As shown, in one embodiment a node storage and service system 310 is coupled to one or more deployment systems 320. Node storage and service system 310 is configured to handle and store the nodes before and after the deployment and retrieval operations performed by node deployment system 320, and is described in more detail in U.S. patent application Ser. No. 14/711,262, filed on May 13, 2015, incorporated herein by reference. Node storage and service system 310 is configured such that each operational task is located within a container. In one embodiment, each container has separate control systems for local and/or remote operation of the tasks performed in the container. With this modular/container-based system, the addition and/or removal of service and storage containers based on the particular survey and/or vessel requirements is straightforward. In one embodiment, node storage and service system 310 consists of a plurality of containers, including cleaning container 312, charging/downloading containers 314, service/maintenance container 316, storage containers 318, and auxiliary containers 319, which are interconnected by conveyor or transport system 350. In one embodiment, transport system 350 comprises a conveyor section 351 that couples deployment system 320 to node storage and service system 310 and conveyor section 352 that is configured to transfer auxiliary equipment (such as weights and transponders) between the deployment system and the node storage and service system. This invention is not dependent upon the particular storage and service system utilized on board the vessel.

In a first or deployment mode, node deployment system 320 is configured to receive nodes from node storage and service system 310, to couple those nodes to a deployment line, and to deploy those nodes into a body of water. In a second or retrieval mode, node deployment system 320 is configured to retrieve nodes from a body of water, de-couple those nodes from a deployment line, and to transfer those nodes to node storage and service system 310. Thus, node deployment system 320 may also be characterized as a node retrieval system in some situations. In one embodiment, the deployment line is stopped in the correct position and the seismic node is manually attached to the deployment line, and in another embodiment the seismic node is accelerated to match the deployment speed of the deployment line and automatically attached to the deployment line. At the same time, via an automatic, semi-automatic, or manual process, auxiliary equipment (such as weights or transponders) may also be attached to the deployment line at selected intervals. In one embodiment, transponders, weights, and other seismic devices may be directly attached to the deployment cable by coupling one or more node locks to the device and/or to a housing surrounding the device. The node deployment system is also configured to deploy and retrieve a deployment line or cable into and from a body of water. The deployment line and/or cable system may be continuously laid down on the seabed, but in some instances it can be separated and buoyed off at select intervals to cope with obstacles in the water or as required by spread limitations for a particular survey. Any one or more of these steps may be performed via automatic, semi-automatic, or manual methods. In one embodiment, each node is coupled to and/or integrated with a node lock, as described in more detail in U.S. patent application Ser. No. 14/736,926, filed on Jun. 11, 2015, incorporated herein by reference. The node locks (and attached nodes) may be coupled to and decoupled from the deployment line via node deployment system 320.

As shown in FIG. 3, an autonomous seismic node deployment system may include a plurality of containers, with separate containers containing one or more winches in container 326, one or more node installation devices in container 324, and one or more overboard units in container 322, and other devices and/or systems to facilitate deployment and/or retrieval of a plurality of autonomous seismic nodes from the water before and after the nodes are used in a seismic survey. In one embodiment, the node deployment system 320 is configured to attach and detach a plurality of nodes 110 to a deployment cable or rope 108 and for the deployment and retrieval of the cable into the water. In an alternative embodiment, the marine vessel includes two such node deployment systems, with the second system being either a backup or used simultaneously as the first system. In one embodiment, the deployment system receives nodes from the node storage and service system at the node installation container 324. In one embodiment, the overboard unit container 322 facilitates deployment and retrieval of the deployment line with the coupled nodes, and may contain one or more overboard wheels at least partially if not entirely extending off of a back portion of the marine vessel. Deployment system may operate in automatic, semi-automatic, or manual processes. A partially or entirely automated system reduces man-power requirements for deployment and retrieval operations and increase overall safety, efficiency, and reliability of the seismic survey. Additionally, such embodiments may allow for operation in harsh climates.

In some embodiments, the components of the node deployment system may be installed longitudinal in standard or custom-made twenty-foot cargo containers. One embodiment of the node deployment system 320 uses standard sized ISO shipping containers in a plurality of configurations for efficient deployment of the nodes. Standard sized containers are typically 20 or 40 feet long and 8 feet wide. The heights of such containers may vary from 8 feet for standard height containers to 10 feet, 6 inches for high-cube or purpose made containers. In other embodiments, containers may be custom designed and ISO certified. Each container preferably has a floor, roof, and sidewalls, with various portions removed to facilitate transfer of nodes to, from, and within each container as needed, or to allow service personnel access to the container. These containers may include additional frame supports to the floor and/or sides. The content of each container is modified for the particular task of the container, such as line deployment and tensioning, node attaching, and node/line deployment, etc. The containers can be transported via air, road, train, or sea to a destination harbor and mobilized on a suitable vessel. The containers may be transferred to the deck of a vessel via a crane or other lifting device and then secured to the deck and coupled to each other through various fastening mechanisms. The containers may be positioned side to side, end to end, and even on top of each other (up to 3 or 4 levels high) on the deck depending on the specific layout of the containers, need of the survey, and requirements of the vessel. The system setup may vary from job to job and from vessel to vessel, in both layout and number of modules/containers utilized.

FIGS. 4A and 4B show various views of a deployment system from a side and top perspective, respectively. Similar to FIG. 3, node deployment system comprises a first container 410 configured to hold a winch system 412, a second container 420 configured to hold a node roping/coupling/attaching system (and, likewise, a deroping/decoupling/detaching system) 422, and a third container 430 configured to hold an overboard unit 432. In one embodiment, the first and second containers are standard 20 foot long containers and the third container is a 40 foot long container. In some embodiments one or more tension control systems 438 and a cleaning system 436 may be utilized that may be located in one of the aforementioned containers, such as overboard unit container 430. Winch system 412 may be coupled to a cable spooling guide 414 that is configured to deploy and retrieve cable from a spool of the winch system and route the cable to node installation container 420. Node attachment system 422 may be coupled to a node feed system 424, a node remover 425, and one or more sheaves 426, 428, all of which may be contained within container 420. In other embodiments containers are not utilized and the components of the node deployment system may be coupled directly to the back deck of a marine vessel. In one embodiment, as shown in FIG. 4C, a second deck or level of containers is utilized for additional components of the node deployment system and/or as back-up components. For example, in one embodiment, node deployment system may comprise an additional winch system 412b located in second winch container 410b which sits upon first winch container 410, and an auxiliary equipment container 440 which sits upon node installation container 420. In some embodiments, portions of the deployment system may extend out over portions of the deck of the marine vessel. For example, a portion of overboard unit container 430 may extend beyond the back deck of a marine vessel. For example, overboard unit 432 may be retractable into and out of overboard unit container 430.

In one embodiment, the node deployment system may comprise one or more control systems, which may comprise or be coupled to a control system located in each container. In one embodiment an operator may be located inside one or more of the containers, or even in a remote location such as off of the vessel, and operate the entire node deployment system. In other embodiments, the control system can be operated from a surveillance cabin or by remote control on the deck or by both locations. In one embodiment, the control system may be designed for variable control tension on the deployment line and may interface various components and systems of the node deployment system (such as the winch, node installation machine, overboard unit, and outboard node detection unit) together for smooth operation during retrieval and deployment. Besides having slow start up and slow down sequences, the system may have quick stop options for emergency situations, which can be activated automatically or manually. In one embodiment, the control system can make various measurements at different portions of the deployment systems, including tension on the cable, angle of the cable, and speed of the cable, and the like. In some embodiments, the control system continuously obtains and utilizes information about vessel roll, yaw, and pitch (speed and amplitude) and other factors (cable speed, tension, and deployed length) to ensure adequate movement and positioning of the overboard system and overboard wheel.

Overboard Container

The overboard container facilitates deployment and retrieval of a cable with coupled nodes to and from the water. In one embodiment, the deployment cable runs from winch container 410 to node installation container 420 to overboard unit container 430 and then into the sea. Referring to FIGS. 4A-4C, an overboard container may comprise an overboard unit 432, a cable clamper/stopper 434, a cleaning station 436, one or more cable tension machines 438, a buoy off winch 439, and one or more auxiliary winches 437. In some embodiments, container 430 is at least partially disposed over the back deck of the vessel (as shown in FIG. 3).

In one embodiment, cable stopper 434 may be a fixed point that holds the cable end-termination and may be used when joining cables and otherwise when an operator needs to de-tension the cable. The cable clamper may clamp a cable at other locations than at end-terminations, and may clamp the cable for two sides and squeeze hard enough so that the cable may not escape.

In one embodiment, cleaning station 436 comprises a carriage and a washing unit, and may include node guides running the full length of the cleaning station to assist node travel. In an embodiment, the washing machine may run on pneumatics and wash with freshwater or seawater. The length of the washing machine is configured to allow sufficient time to wash, clean, and/or rinse nodes that may be smeared with mud or other debris. At full speed of 3 knots (approximately 1.5 m/s), a length of five meters allows approximately three seconds to wash a node. In one embodiment, a washing carriage inside the cleaning station may grab the cable (such as via one or more ferrules coupled to the cable) ahead of a node and hang onto the node and/or cable over the full length of the washing machine. Such an embodiment may move longitudinally along one or more guide rails and may use a pneumatic rodless cylinder (or the like) that returns the washing carriage to the starting point ready for the next node to arrive for washing. In one embodiment, the cleaning station includes a plurality of washing nozzles that spray the nodes from the sides and/or from below, and in other embodiments a plurality of washing nozzles are provided from above the cleaning station and spray the nodes from above. The washing nozzles may remain on during the entire retrieval process, or they may be selectively turned on and off when a node enters the cleaning station. The cleaning process can be performed automatically, semi-automatically, or manually. In other embodiments, the cleaning station and/or the overboard unit container may also include a fresh water station, such that the nodes are also rinsed with fresh water to reduce the risk of corrosion from salt water. In other embodiments, the cleaning and/or the overboard unit container may also include a pneumatic drying station prior to their delivery to the node storage and service system.

In other embodiments, the overboard unit container may comprise a plurality of cable tension machines, a cable cutter, a work table, a plurality of winches, and a control system. For example, electric buoy-off winch 439 may be used to lower the cable end to the seafloor and auxiliary winch 437 may be used to anchor weights and pull out the first cable end from the winch and similar functions. As another example, the cable cutter may be used as an emergency tool if the vessel has an emergency situation, a blackout, or in other situations where there is no other option than to cut the cable. As another example, cable tension machine 438 may be placed before and after cleaning station 436 that may help the cable from going slack and may aid the operators when feeding cable through the deployment system. In one embodiment, a cable tension machine does not significantly affect the cable tension on the winch. A cable tension machine may comprise two horizontal rollers, and may also include a pair of vertical side-rollers to help prevent the cable from escaping sideways. The rollers may be retracted vertically or horizontally via electric, pneumatic, or hydraulic motors, and may allow nodes to pass without touching the rollers.

In still other embodiments, the deployment system and/or overboard container may include one or more node detection devices used to automatically identify and track nodes during deployment and retrieval operations. In one embodiment, such a system includes a radio-frequency identification (RFID) system that shows and identifies a node passing by particular points in the deployment system by radio frequency, as well as other wireless non-contact devices and methods (such as optical detection sensors) that can identify tags and other identification devices coupled to nodes.

Overboard System

Figure 5A:
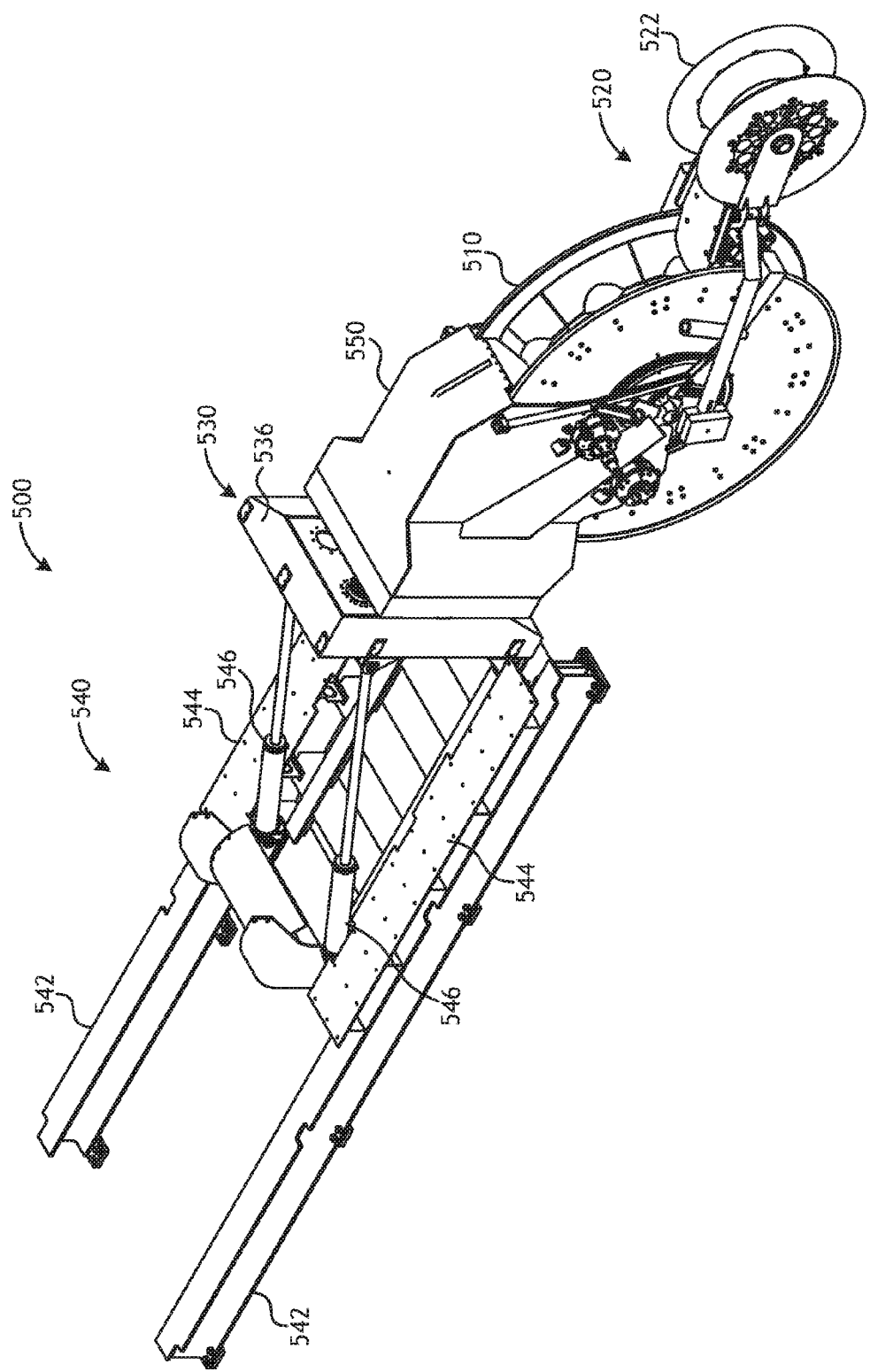
FIG. 5A is a perspective view diagram illustrating one embodiment of an overboard unit system with the overboard unit in the deployed mode.
Figure 5B:
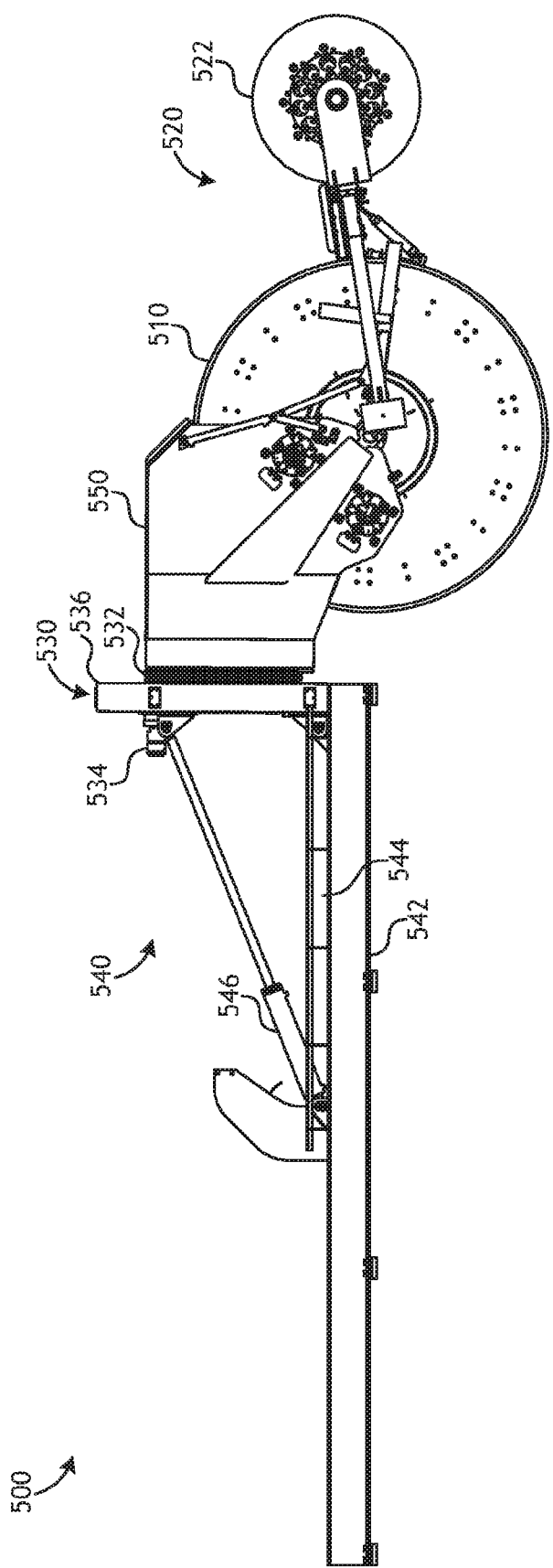
FIG. 5B is a side view diagram illustrating one embodiment of an overboard unit system with the overboard unit in the deployed mode.
Figure 5C:
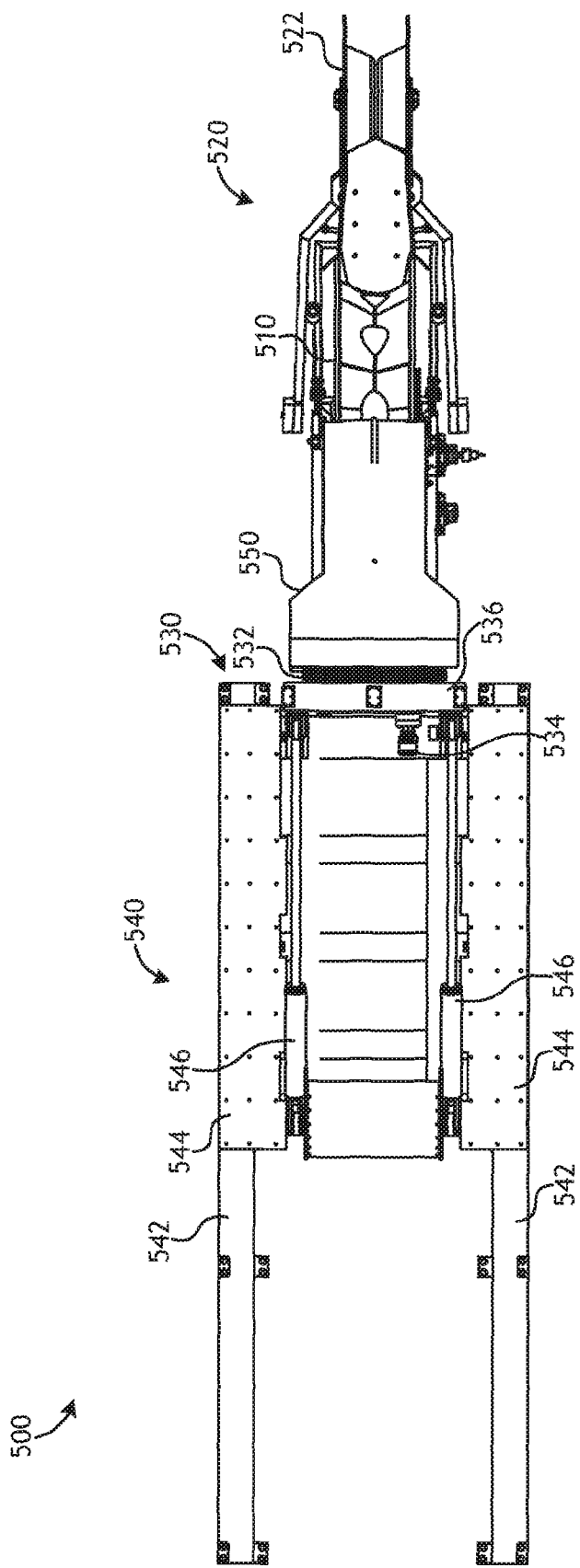
FIG. 5C is a top view diagram illustrating one embodiment of an overboard unit system with the overboard unit in the deployed mode.

FIGS. 5A, 5B, and 5C illustrate perspective, side, and top views, respectively, of one embodiment of an overboard system 500. The overboard system facilitates deployment and retrieval of a cable with coupled nodes to and from the water and acts to guide the cable over the stern of the vessel. In one embodiment, overboard system 500 comprises an overboard wheel 510, a cable detection system 520 that comprises a cable detection unit or wheel 522, slewing ring assembly 530, retraction assembly 540, and overboard wheel frame 550. In one embodiment, overboard system 500 may be coupled to and/or located within a container (such as 40' long high-cube container 430). The overboard system may comprise or be coupled to a control system and a plurality of sensors or detectors configured to detect the orientation, position, speed, and other characteristics of the deployment cable and/or nodes.

Retraction assembly 540 couples a retractable portion of overboard system 500 into overboard container 430. In one embodiment, retraction assembly 540 comprises a main frame that comprises a plurality of horizontal I-beams 542 fixed to the container floor, a plurality of sliding frames or beams 544 that slide on horizontal beams 542 in a longitudinal direction, and a plurality of cylinders 546 configured to tilt the overboard unit approximately 45 degrees before retracting the unit into the container. In one embodiment, the cylinders are fully extended during normal operation of the deployment system and overboard unit, thereby keeping slewing ring assembly 530 in a substantially vertical position. The cylinders may be partially retracted to at least partially elevate, tilt, and/or retract overboard wheel 510 as necessary. Overboard wheel 510 can be retracted into and out of a container for service, maintenance, storage, and/or transport. In one embodiment, a plurality of cylinders (not shown) are mounted between and attaching to horizontal beams 542 and sliding beams 544 and are configured to slide the sliding beams 544 back and forth on the lower beams 542. Cable detection wheel 522 is configured to fold over the top of overboard wheel 510 when the overboard system is retracted into the container. In one embodiment, the plurality of cylinders 546 are directly coupled or attached to slewing ring assembly 530 and/or frame 536.

In one embodiment, slewing ring assembly 530 comprises a frame or plate 536 surrounding slewing ring 532. In some embodiments, frame or plate 536 may comprise a plurality of vertical beams that are attached to cylinders 546 and that act as a supporting structure for plate 536 and/or slewing ring 532. Slewing ring 532 is a large diameter bearing that allows high forces to act on it while it is rotating, such as axial and radial loads and tilt moments. Slewing ring 532 may be face mounted to a supporting structure or plate 536 and has a large hole through the center that can allow the node to pass through during deployment and retrieval of the cable. Slewing ring 532 is able to rotate by actuation of hydraulic motor 534 (shown in FIGS. 5B and 5C). In one embodiment slewing ring 532 is part of a rack and pinion system. Slewing ring 532 may be coupled to wheel frame 550. In one embodiment, wheel frame 550 comprises a partially open housing that extends over a portion of overboard wheel 510 and directly attaches to slewing ring 532 on one end or face of wheel frame 550. In other embodiments, wheel frame 550 may comprise a pair of arms, with each arm connected to a side of overboard wheel 510. Overboard wheel 510 is coupled to slewing ring assembly 530 by overboard wheel frame 550. Rotation of slewing ring 532 rotates overboard wheel frame 550 and overboard wheel 510 in a clockwise or counterclockwise direction when viewing the overboard system from the rear side of the vessel. In operation, wheel 510 is at least partially disposed over the back deck of the vessel, and in some embodiments all or substantially all of overboard wheel 510 extends beyond the back deck of the vessel. Cable detection system 520 comprises cable detection wheel 522 and is coupled to overboard wheel 520 by a plurality of arms. In a typical deployment and/or retrieval operation, cable 108 extends through the overboard unit container through slewing ring 532, over overboard wheel 510, over cable detector wheel 522, and into a body of water. As described in more detail later, overboard system 500 is configured to pivot and/or rotate overboard wheel 510 and cable detection system 520 in multiple directions in response to the cable position as detected by wheel 522. In one embodiment, overboard wheel 510 is configured to point and/or be positioned in the direction of the cable as it is being deployed and/or retrieved from the water and may be maintained in a substantially aligned position with cable detection wheel 522.

Overboard wheel 510 guides the deployment cable and protects the nodes as they enter and/or leave the vessel during deployment and/or retrieval operations. This offers significant advantages over the prior art, including chutes, ramps, and other overboard units and wheels. In particular, because the disclosed system helps keep the cable constrained on the overboard wheel without the cable falling off or being dragged to one side, which is typical in prior art overboard units, the disclosed overboard system allows the vessel to operate in more severe weather conditions, provides better control of the deployment cable, reduces cable tension (less friction), and provides increased operational safety and efficiency. In some embodiments, the disclosed system facilitates alignment of the nodes into a pocket of overboard wheel 510 and protects the node and deployment cable from stress and/or damage during retrieval and deployment operations.

Overboard Wheel

Figure 6A:
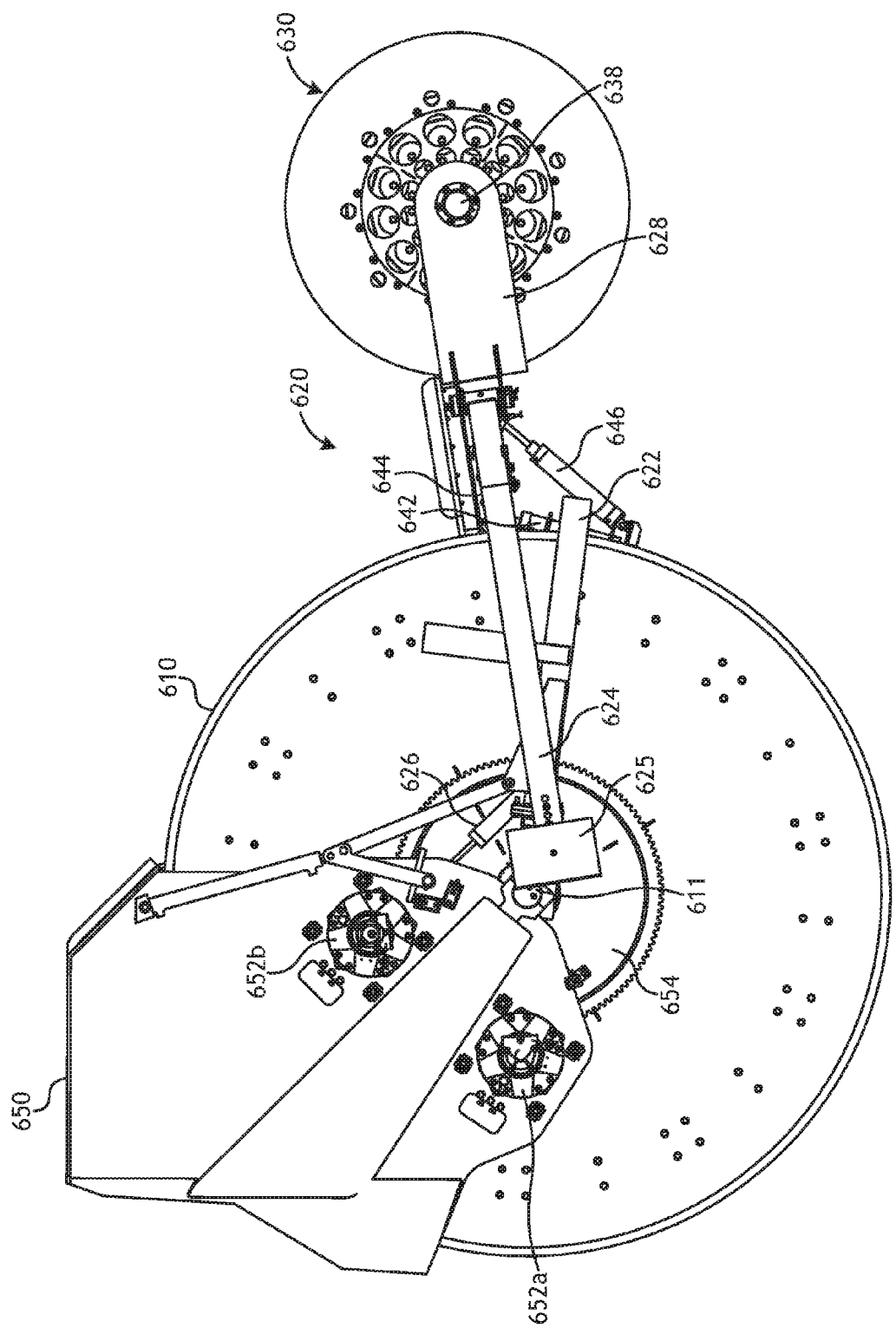
FIG. 6A is an enlarged side view diagram illustrating one embodiment of an overboard unit system with the overboard unit in the deployed mode.
Figure 6B:
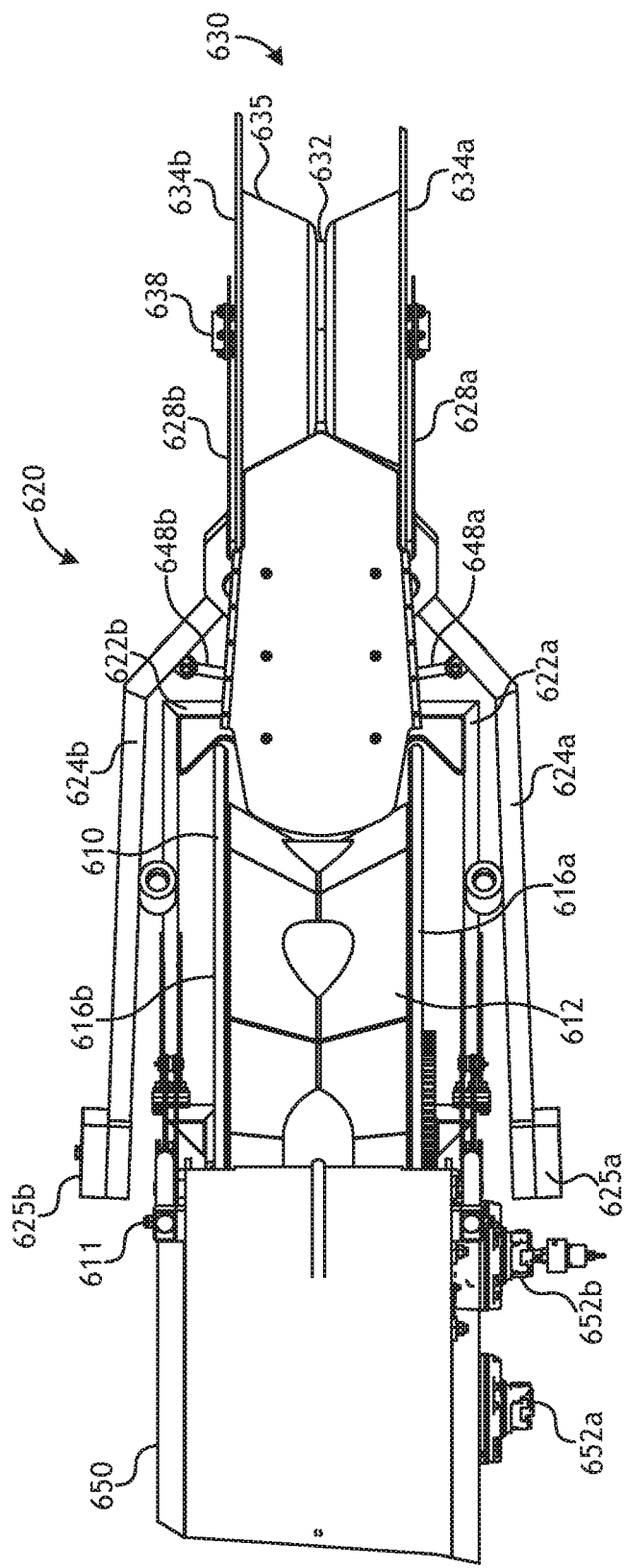
FIG. 6B is an enlarged top view diagram illustrating one embodiment of an overboard unit system with the overboard unit in the deployed mode.

FIGS. 6A and 6B illustrate a side and top schematic, respectively, of a portion of overboard system 500. In one embodiment overboard wheel 610 and cable detection system 620 are substantially similar to overboard wheel 510 and cable detection system 520. In one embodiment, overboard wheel 610 comprises two flanges 616a and 616b that are coupled to a shaft 611 and spaced apart by a plurality of roller modules 612. Overboard gear rim 654 is mounted on one or more of the flanges and is configured to rotate the overboard wheel in a clockwise and counterclockwise fashion when viewed from the side of the overboard wheel (as shown in FIG. 6A). Overboard wheel frame 650 is coupled to slewing ring assembly and to overboard wheel 610 via shaft 611. Wheel frame 650 comprises one or more actuating motors 652a, 652b that are configured to move overboard gear rim 654. In one embodiment, the cable circumference of the overboard wheel (e.g., the circumference around the wheel of which a deployment line or cable may travel) may be one quarter of the node-to-node distance. For example, the distance between adjacent nodes on the deployed cable may be approximately 25 meters, and the cable circumference for such an embodiment may be approximately 6.25 meters.

Figure 7A:
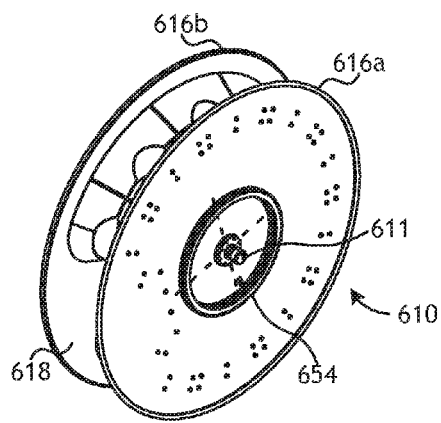
FIG. 7A is a perspective view diagram illustrating one embodiment of an overboard wheel.
Figure 7B:
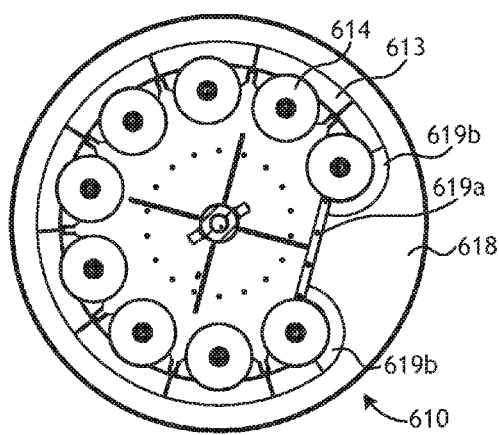
FIG. 7B is a cross-sectional side view diagram illustrating one embodiment of an overboard wheel.
Figure 7C:
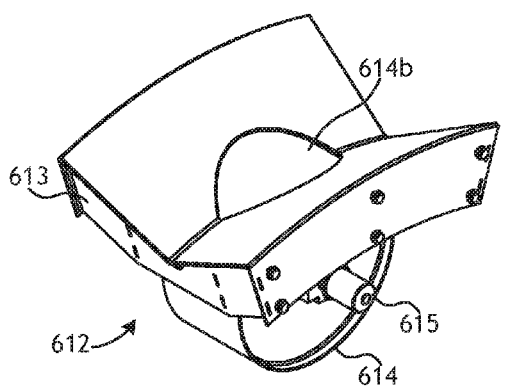
FIG. 7C is a perspective view diagram illustrating one embodiment of a roller module.
Figure 7D:
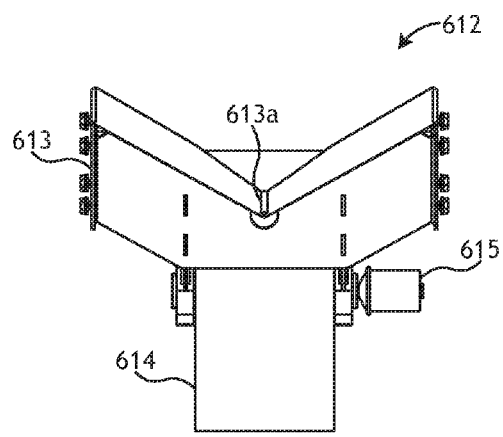
FIG. 7D is a front view diagram illustrating one embodiment of a roller module.

In one embodiment, as shown in FIG. 6B, overboard wheel 610 comprises a plurality of (such as nine) roller modules 612 spaced apart in a circular fashion between flanges 616, so as to form opening or pocket 618. Roller modules 612 form a path within overboard wheel 610 over which the cable with attached nodes moves across during deployment and retrieval. Overboard wheel 610 and roller modules 612 are shown in more detail in FIGS. 7A-7D. As shown in FIGS. 7A and 7B, overboard wheel 610 may also comprise a node opening or pocket 618 which is configured to receive and/or hold a node when the deployment line is being retrieved and/or deployed across overboard wheel 610. Thus, pocket 618 is designed to fit the particular dimensions of the node and/or attached seismic device. In contrast to conventional overboard wheels, this design protects the node and node locks from damage and stress when passing over overboard wheel 610, as the node does not directly contact the overboard wheel during deployment and/or retrieval operations. Overboard wheel 610 is configured to rotate a predetermined or calculated distance to position pocket 618 in the correct position to receive the node. The position of overboard wheel 610 relative to the cable may be configured to automatically rotate just before a node lands on the wheel. The use of nine roller modules 612 makes it easy to slow down or speed up overboard wheel 610 to fit and/or position the node in pocket 618. In one embodiment, pocket 618 is sized to receive, store, and/or hold substantially all of a node while the deployment line is moving along overboard wheel 610. In some embodiments, overboard wheel 610 comprises a plurality of pockets such that overboard wheel 610 may not need to change its position as much to receive a node. In other embodiments, each of the roller modules 612 is substantially the same size, and in other embodiments, each of the roller modules 612 may comprise different diameters or sizes for easier node placement in pocket 618. In still other embodiments, overboard wheel 610 may comprise a carousel type carrier with a plurality of baskets, each sized to hold a node. Still further, overboard wheel 610 may comprise a plurality of wheels with a pocket between each wheel. In still other embodiments, pocket 618 is configured to hold and/or receive other seismic equipment, such as transponders and weights, which may be coupled to a deployment line in a similar manner as nodes 110.

Each roller module 612 may comprise a welded distance module 613 and a roller 614 mounted on a shaft 615. In one embodiment, roller module 612 is made of stainless steel components. The sides of welded distance module 613 are bolted to the inside portions of flanges 616a and 616b. As shown in more detail in FIGS. 7C and 7D, welded distance module 613 comprises two sides which slope and/or radially curve to a middle section to form a groove or middle point 613a of the distance module. A middle portion of welded distance module 613 is open and/or removed to allow a portion 614b of the roller to extend and/or protrude out from an opening in distance module 613. Thus, overboard wheel 610 is configured to allow a deployment line to contact a plurality of rollers 614 during deployment and/or retrieval operations. Rollers 614 decrease the resistance of cable movement over overboard wheel 610, thereby preventing friction and increasing the longevity of the deployment cable and attached nodes. In some situations, overboard wheel 610 need not substantially move and/or rotate during deployment and/or retrieval operations as the rotation of the plurality of rollers 614 provides enough movement for deployment and/or retrieval of the cable. Roller modules 612 may or may not be operatively coupled to each other. In one embodiment roller modules 612 are not powered and simply rotate about a shaft with movement of the deployment cable, while in other embodiments roller modules 612 may each be powered and/or actuated by a motor to assist in movement of the cable over overboard wheel 610.

As shown in more detail in FIG. 7B, while each of roller modules 612 may be substantially the same size, welded modules 619b surrounding pocket 618 may be different than the remaining welded modules 613. Because the pocket 618 creates a space in overboard wheel 610, that space or opening may be covered up or protected by various inserts, such as welded module inserts 619a and 619b. Inserts 619a and 619b may be positioned between and/or coupled to each of the roller modules 612 that are adjacent to pocket 618.

Cable Detection System

In one embodiment, cable detection system 620 is configured to monitor the position of the cable (such as a vertical and horizontal angle of the cable) as it is being deployed and/or retrieved. In one embodiment, cable detection system 620 may monitor the cable angle in a plurality of planes (such as the vertical abeam plane and the vertical fore and aft plane). In other embodiments, cable detection system 620 may monitor movement of the wheel in a vertical direction and/or a horizontal direction. In other embodiments cable detection system may also be configured to detect the position of a node. The overboard unit 610 is configured to change its position (whether by pivot or rotation) in response to measurements by cable detection system 620.

As shown in FIGS. 6A and 6B, cable detection system 620 comprises cable detection unit 630, such as a cable detection wheel, and is coupled to overboard wheel 610 by a plurality of cable detection arms 622. Cable detection system 620 may also comprise a plurality of arms 628 that couples cable detection wheel 630 to detection arms 622. In one embodiment plurality of arms 622 are attached to shaft 611 on overboard wheel 610. Cable detection system 620 may also comprise a plurality of counterweight arms 624 coupled to one or more counterweights 625. Counterweight arms 624 are used to balance and/or account for the weight of cable detector wheel 630 and associated components on the overall overboard system, allowing for more precise sensing and control of the system. In one embodiment, counterweight arms 624 can be extended towards and/or away from overboard wheel 610 to change the weighted balance of the overboard system. Counterweight arms 624 are configured to allow movement of detector wheel 630 in a horizontal and/or vertical direction if the arms are in an open position adjacent to overboard wheel 610.

In one embodiment, as shown in FIG. 6B, cable detection wheel 630 may be a roller wheel 635 with a groove 632 angled down the center of roller wheel 635 and configured to receive the deployment cable. Roller wheel 635 is configured to rotate around shaft 638. Wheel 630 may comprise a plurality of flanges 634a, 634b on either side of roller wheel 635. Cable detection wheel 630 is coupled to cable detection system 620 by a fork 628 comprising a plurality of arms 628a, 628b coupled to shaft 638. The cable detection system 620 may pivot around the center of overboard wheel 610. In other embodiments wheel 630 may comprise a plurality of detection spokes that extend out from the wheel in a radial direction. In some embodiments, overboard cable detection wheel 630 can be folded in over the top of overboard wheel 610, which is particularly useful when the overboard unit is retracted in the container. In one embodiment cable detection wheel 630 is not powered and simply rotates about shaft 638 with movement of the deployment cable, while in other embodiments cable detection wheel 630 may be powered and/or actuated by a motor to assist in movement of the cable. In still other embodiments, cable detection wheel may be similar in configuration but smaller in size as compared to overboard wheel 610, and may also include a pocket configured to receive a node.

As shown in FIG. 6A, cable detection system 620 may comprise a vertical shaft 642, a horizontal shaft 644, and one or more cylinders (hydraulic or pneumatic) 646. Vertical shaft 642 may be coupled to plurality of arms 628 and is configured to rotate cable detector wheel 630 in a horizontal direction (e.g., left to right and right to left when viewed from the rear). Horizontal shaft 644 may also be coupled to plurality of arms 628 and is configured to air dampen cable detector wheel 630 in a vertical direction. In other words, cable detector wheel 630 is able to pivot and/or rotate in multiple planes and/or directions based on rotation around shafts 642 and/or 644, which in one embodiment may be considered a pivot or fulcrum point for cable detector wheel 630. Cylinders 648 (see FIG. 6B) are attached to counterweight arms 624 and are configured to extend and retract arms 624 as appropriate. In one embodiment, cable detection system 620 may comprise an air cushion system, which may be coupled to cylinder 646 and additional hydraulic cylinders. The air cushion system helps stabilize the position of cable detection wheel 630 and prevents unwanted movement of cable detection wheel 630. The responsiveness and/or stiffness of the air cushion system can be adjusted to respond to movements of the cable detection wheel quicker. In one embodiment, the air cushion system and/or cylinder 646 function as a micro adjustment to the cable detection system in that it can make minor changes to the position of the cable detector wheel in a fast and efficient manner. On the other hand, movement of cable detection arms 622 about shaft 611 functions as a macro adjustment to the cable detection system in that arms 622 can make large changes to the position of cable detection wheel 630 if necessary. Plurality of counterweight arms 624 coupled to one or more hydraulic cylinders 646 helps cable detector wheel 630 operate within an intended range of motion that is not outside the air cushion system's operational range. In one embodiment, the range of the air cushion is set by the length of the piston within cylinder 646 and the air pressure inside cylinder 646.

Cable detection system 620 may also comprise and/or be coupled to a control system configured to move overboard wheel 610 and/or cable detection wheel 630 in response to cable measurements and/or positions. In one embodiment, the control system can make various measurements at different portions of the deployment system and/or overboard system, including tension on the cable, angle of the cable, and speed of the cable, and the like. Some embodiments of the control system may use a closed-loop regulation where a signal from the outboard cable detection wheel 630 will direct overboard wheel 610 to always point in the cable direction. The control system may be configured to continuously obtain and utilize information about vessel roll, yaw, and pitch (speed and amplitude) and other factors (cable speed, tension, and deployed length) to ensure adequate speed and force on the pivot movement and operation of the overboard wheel. In some embodiments, a node position signal may come from an inboard or outboard node detection system, as described below. In one embodiment, the control system comprises a plurality of measuring sensors coupled to the cable detection system that are configured to keep overboard wheel 610 in line with the cable and/or cable detection wheel 630. In other embodiments, the measuring sensors measure both a vertical and horizontal cable angle relative to the current overboard wheel position. A first measuring sensor may be located on or coupled to vertical shaft 642, a second measuring sensor may be located on or coupled to horizontal shaft 644, and a third measuring sensor may be located on or coupled to one of more of arms 622, 624, and 628. In one embodiment, sensors located in shafts 642, 644 detect relative movement between the shaft and the shaft housing. In some embodiments, the control system may also comprise a plurality of position sensors, such as incremental and absolute encoders, which are configured to take measurements of the orientation, position, and/or velocity of the various components of the deployment system (including a vertical and horizontal angle of the deployment cable) to enable the control system to respond accordingly.

In one embodiment, as shown in FIG. 6A, hydraulic piston 626 may couple wheel frame 630 to one or more of arms 622. Actuation of piston 626 may drive cable detection wheel 630 towards the cable at a predetermined force (such as 20 kg). The force towards the cable should be strong enough for cable detection wheel 630 to not let go of or decouple from the deployed cable but also weak enough to not significantly affect the cable path. In other words, the force applied from cable detection wheel 630 should be a small resistance force and/or just enough force to determine the position of the cable during deployment and/or retrieval of the cable. Such a small force causes minimum stress and friction to the node and node lock as they pass over the cable detection wheel. In one embodiment groove 632 is sized and configured to receive the cable and to hold the cable within the groove such that any force directed on the cable is transferred to cable detection wheel 630. A change in cable direction may move cable detection wheel in a horizontal and/or vertical direction. Such movement may be detected by one or more measuring sensors. The control system and/or motor 534 driving slewing ring 532 may rotate overboard wheel 610 in a position to more effectively deploy and/or retrieve the cable. In one embodiment, overboard wheel 610 may move into a position such that the cable path on the overboard wheel 610 and cable detector wheel 630 are substantially aligned and/or within the center position or groove of such wheels. Such cable direction changes may be caused by any number of vessel, cable, or environmental factors, including change in vessel direction, speed, or angle, as well as a change in the cable direction, speed, or angle, as well movements caused by a vessel roll or changes in crab-angle.

Figure 8A:
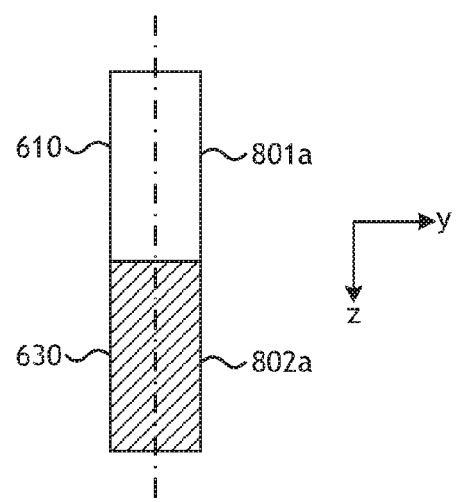
FIGS. 8A-8E illustrate end view diagrams of one embodiment of an overboard wheel and a cable detection wheel in various operational positions.
Figure 8B:
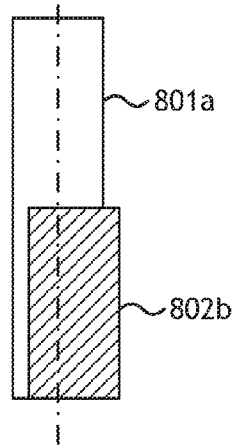
Figure 8C:
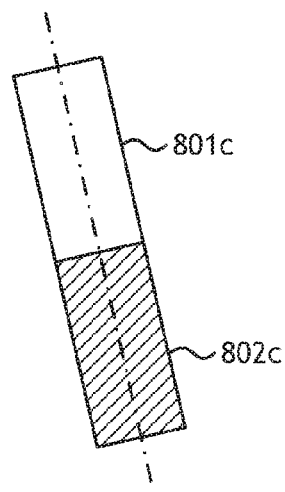
Figure 8D:
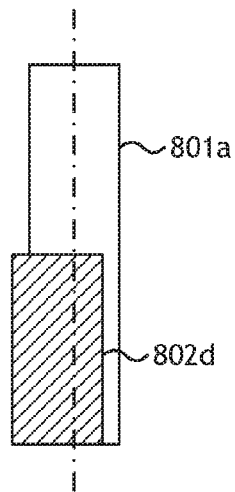
Figure 8E:
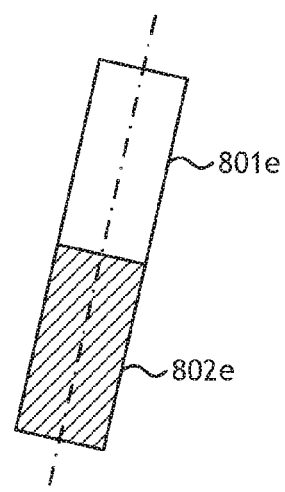

This horizontal movement is reflected in FIGS. 8A-8E, which show various rear view schematics of overboard wheel 610 and cable detection wheel 630 of an overboard system during deployment and/or retrieval of a cable. FIG. 8A shows overboard wheel 610 and cable detection wheel 630 in a starting or initial position 801a and 802a, respectively. In this embodiment, the central axis of each wheel is substantially aligned along a vertical axis. As shown in FIG. 8B, when cable detection wheel moves horizontally to the right to position 802(b), the vertical axis of the cable detection wheel is now misaligned with the vertical axis of the overboard wheel. The control system is configured to detect this change in position of the cable detection wheel and/or position/direction/angles of the cable, and based upon various algorithms and predetermined control points, the control system rotates slewing ring 532 so as to change the position of the overboard wheel in a counterclockwise direction (as viewed from the back and as shown in FIG. 8C) to position 801c so as to better align the cable route over the overboard wheel and cable detection wheel. Movement of overboard wheel 610 to position 801c causes cable detection wheel 630 to move to position 802c, as shown in FIG. 8C. If the cable moves horizontally left from an initial position, an equivalent (but opposite) procedure is performed as shown in FIGS. 8D and 8E, eventually causing overboard wheel 610 to move to a position 801e and cable detection wheel 630 to move to a position 802e. In one embodiment, the misaligned positions in FIGS. 8B and 8D are exaggerated to show movement and operation of the system, and in one embodiment the overboard wheel and cable detection wheel are never substantially misaligned as the control system is able to move the overboard wheel in response to minor position changes of the cable detection wheel in substantially real time. Various operation parameters and set points may be used by the control system to effectively control the movement of the overboard wheel. For example, if only a small movement is detected by the cable detection wheel the overboard wheel may move only a small position in a slow manner. However, if a large movement is detected by the cable detection wheel the overboard wheel may move a small or large position in a quick manner. Other embodiments may vary the manner, timing, degree, and extent of movement of the overboard wheel, including a delayed movement or predetermined thresholds prior to any movement based upon the change in position of the cable detection wheel.

Figure 9A:
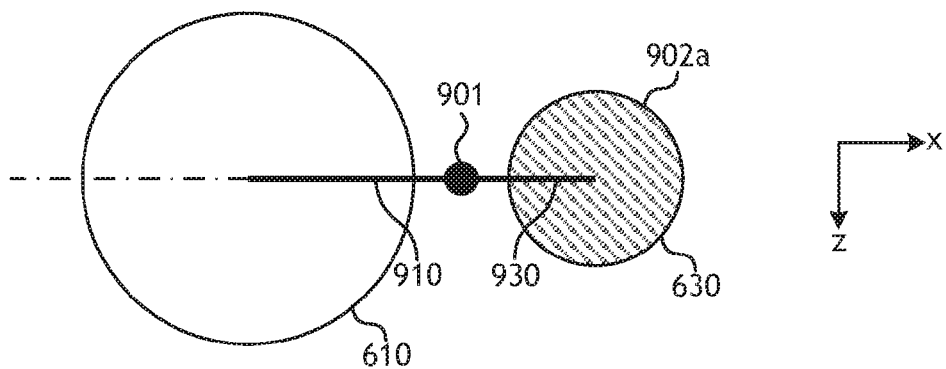
FIGS. 9A-9C illustrate side view diagrams of one embodiment of an overboard wheel and a cable detection wheel in various operational positions.
Figure 9B:
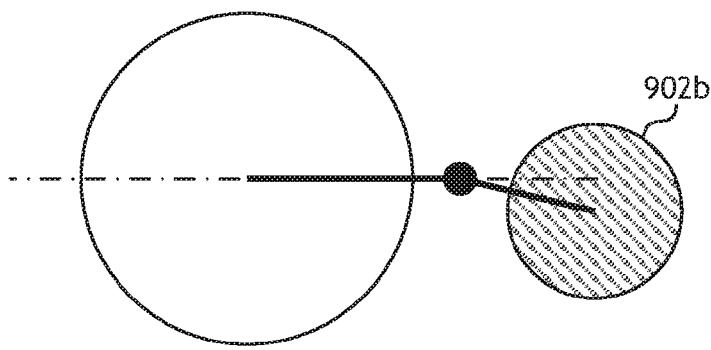
Figure 9C:
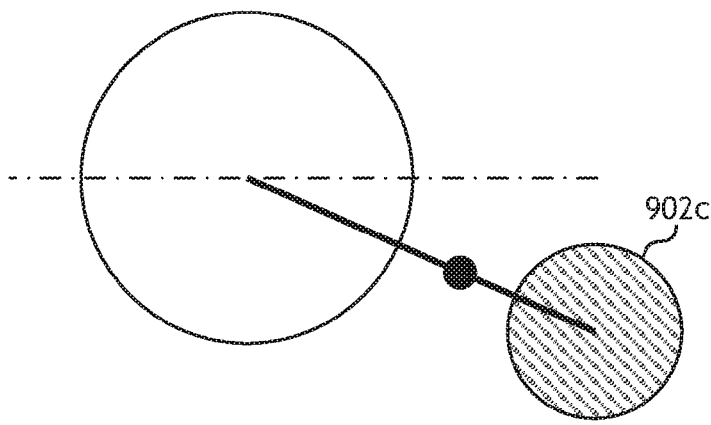

As mentioned above, cable detection wheel 630 is configured to move in a vertical direction in response to one or more hydraulic cylinders and/or based upon the cable force. FIGS. 9A-9C illustrate various side view schematics (in simplified format) of overboard wheel 610 and cable detection wheel 630 of an overboard system during deployment and/or retrieval of a cable. For simplicity, some of the elements from FIG. 9A are not shown in FIGS. 9B and 9C. In an initial position as shown in FIG. 9A, the central horizontal axis of overboard wheel 610 and cable detection wheel 630 in a position 902a are substantially aligned. In one embodiment, fulcrum 901 is a coupling point between the overboard wheel and the cable detection wheel that may pivot horizontally and/or vertically. In one embodiment, it comprises a horizontal shaft (such as shaft 644) and a vertical shaft (such as shaft 642). In other embodiments shafts 644 and 642 may be coupled to separate portions of a frame coupled to the cable detector wheel. In one embodiment, fulcrum 901 is coupled to cable detector wheel 630 by one or more arms 930 (such as arms 628 in FIGS. 6A and 6B) and overboard wheel 610 by one or more arms 910 (such as arms 622 in FIGS. 6A and 6B). For various situations, the cable detection wheel can be moved into lower positions 902b and 902c (as shown in FIGS. 9B and 9C) by one or more hydraulic cylinders, which may remove some or all of the force exerted on the detection wheel by the cable. Likewise, if enough force from the cable is exerted on the cable detection wheel it may also be pushed into a lower position by the force of the cable. In one embodiment, the cable detection wheel is configured to rotate upon pivot fulcrum point 901 in response to applied force by the cable such that it may be moved from a first position 902a to a second position 902b. This movement may or may not be cushioned by operation of cylinder 646 (see FIG. 6A). In some embodiments, rather than having a large cable force continually exerted on the cable detection wheel (which may cause damage to the node and/or cable detection system and extend pass the operating point of cylinder 646), if sufficient force is acted upon the wheel, the control system is configured to re-position the cable detection wheel (e.g., to lower it) to minimize the force acted upon the wheel and/or cylinder 646. In one embodiment, cable detection wheel can be lowered from an upper position 902b to a lower position 902c by operation of cylinder 626 (see FIG. 6A), which lowers arms 910 coupled to the cable detector wheel. Likewise, if there is not sufficient force acting upon the cable detection wheel, the control system is configured to re-position the cable detection wheel (e.g., to raise it) until there is a minimal resistance and/or force acting upon the wheel (such as 20 kg) such that it can detect changes in a position of the cable. In these operations, the vertical position of the overboard wheel may stay substantially the same.

In other embodiments, the cable detection system may also comprise a node detection system, which is configured to detect the position of the nodes on the cable as they are being deployed and/or retrieved through the overboard system. The node detection system can be located inboard or outboard of the overboard wheel. For example, an outboard node detection wheel (which may be the same wheel as the cable detection wheel) may be forced down by a node passing over the top of the node detection wheel rather than or in addition to the cable running in a groove on the detection wheel. In such embodiments, the downward movement followed by an upward movement when the node passes the node detection wheel may be recognized by a control system and the exact node location may be established. The node detection wheel may include flexible spokes sticking out of the wheel and the detection wheel may catch the cable behind the node when a node is passing. The cable detection system may also comprise an inboard node detection device in one or more positions along the deployment system, which may be used in deployment operations. In one embodiment the inboard node detection device may be located between the slewing ring and the overboard wheel. The inboard node detection device may comprise a fork or arm positioned over or adjacent to the deployment cable. As the node is approaching the overboard wheel (whether during retrieval or deployment), the fork may lower onto the cable by a pneumatic cylinder or other moving device. When a ferrule on the cable touches the fork, the arm with the fork may raise automatically to allow the node to pass and the exact location of the node may be established. With such a node detection system (whether located inboard or overboard), the speed of the overboard wheel may be adjusted (increased or decreased) for the node to land in the pocket. In other embodiments, non-mechanical detection systems, such as a light curtain, electromagnetic sensor, or optical sensor may be positioned on the node detection system that detects the position of a node.

In some embodiments, the overboard system may also comprise one or more node orientation detection systems, which is configured to detect odd node orientation and/or directions (for example, all nodes may not hang underneath the cable) or foreign objects coupled to the node and/or cable, such as fishing gear or other debris caught by the cable/node. The orientation detection system may also detect improperly connected node locks or nodes that have not been latched or attached correctly to the cable. In one embodiment, an inboard node orientation detection may be located between the overboard wheel and the slewing ring. In such an embodiment, the control system may be programmed to stop and alert the operator that a node has not gripped firmly around the cable. The operator may then acknowledge the warning and continue with the deployment process and/or stop the deployment and manually remove the node and couple a new node in its place. Various embodiments exist that may be used to detect node attachment issues, including light-curtains. In one embodiment, light curtains are opto-electronic devices that use a plurality of lasers to detect small movements within the sensitivity range of the light curtain by projecting an array of parallel infrared light beams from one or more transmitters to one or more receivers. When an object breaks one or more of the beams a signal is sent to the device. In one embodiment light curtains act as safety devices, and a control system may be configured to stop a particular device and/or deployment system when the light curtain is triggered. By reducing the need for physical guards and barriers, light curtains can increase the maintainability of the equipment they are guarding. The operability and efficiency of machinery can also be improved by the use of light curtains by, for example, allowing easier access for semi-automatic procedures.

Figure 10:
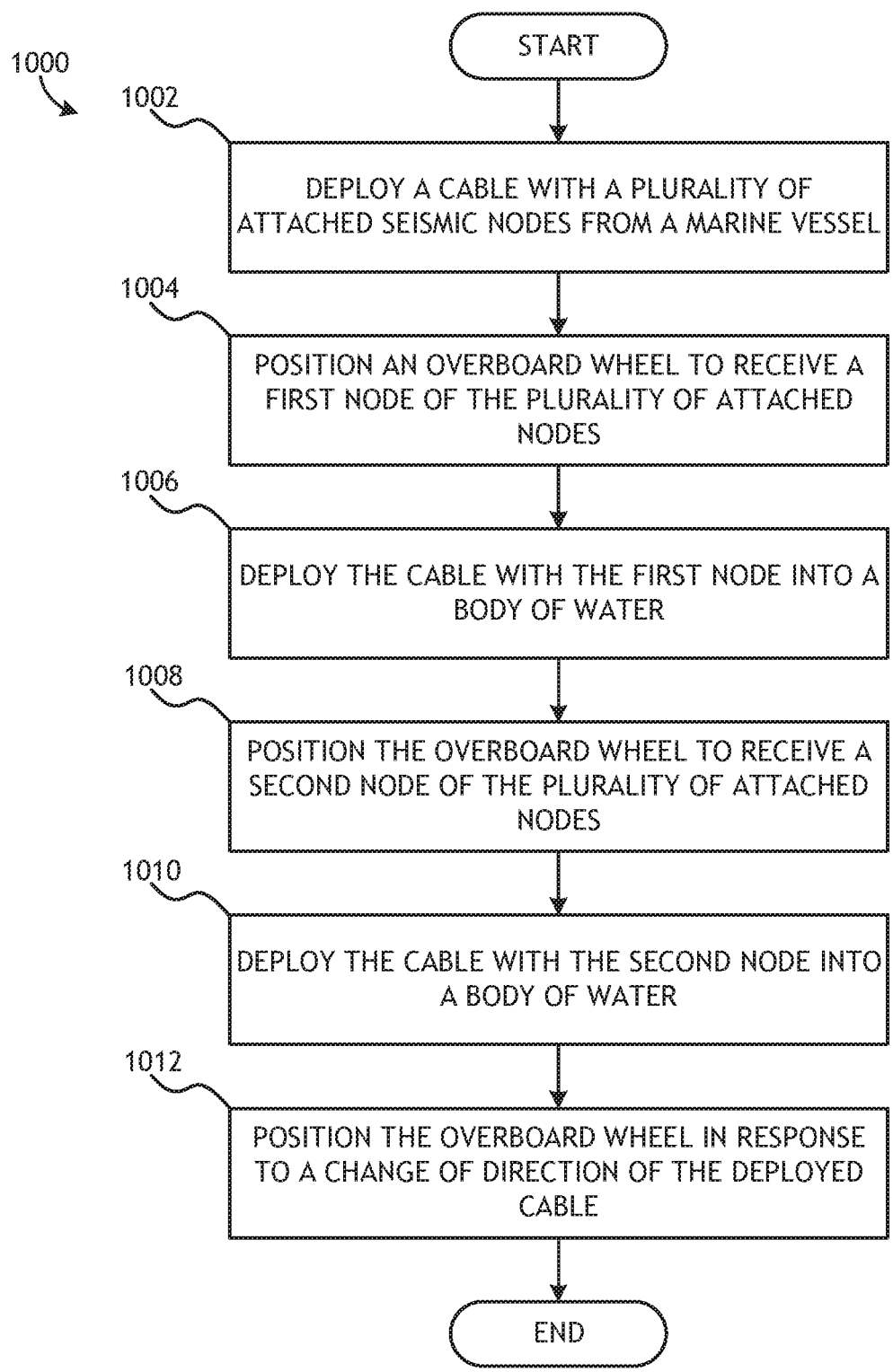
FIG. 10 illustrates one embodiment of a method of deploying a plurality of seismic nodes coupled to a deployment line.

FIG. 10 illustrates one embodiment of a method 1000 for deploying a cable with a plurality of attached nodes from a marine vessel into a body of water. In an embodiment, the method starts at block 1002 by deploying a length of a deployment line 108 from a marine vessel. In one embodiment, the deployment of cable 108 starts by deploying a length of cable through the deployment system from the winch container 326, through the node installation container 324, and then through overboard container 322 and into the water. The cable may be routed manually, semi-automatically, or automatically through slewing ring 532 and frame 550, over overboard wheel 510, and over cable detection wheel 522 into the water. One or more weights may be attached to the cable before or after the cable passes through node installation container 324. Once the appropriate length of cable has been deployed into the water, node 110 is directly attached to the deployment cable by one or more node locks in node installation container 324, as described more fully in Applicant's co-pending U.S. patent application Ser. No. 14/820,306, entitled System for Automatically Attaching and Detaching Seismic Nodes Directly to a Deployment Cable, filed on Aug. 6, 2015, incorporated herein by reference. At block 1004, the method includes positioning overboard wheel 510 to receive the seismic node. In one embodiment the deployment system determines the position of the node on the cable prior to the node crossing over overboard wheel 510. One or more node detection devices (such as a light curtain) may be located in the node installation container and/or overboard container to determine a position of the node. In other embodiments, node installation machine 422 in node installation container 420 determines the position of the node. The control system rotates overboard wheel 510 in either a clockwise or counterclockwise direction to position the node in a pocket 618 on the overboard wheel based on the measured and/or calculated node position. At block 1006, the method includes deploying the cable with the attached first node into the water across the overboard wheel 510. In one embodiment the tension/force on the deployment cable drags, pulls, or moves the node over overboard wheel 510 and over second overboard wheel 522 and then passes into the water. In some embodiments, overboard wheel 510 is actively rotated (e.g., powered) to match the deployment speed of the cable. At block 1008, the method includes positioning overboard wheel 510 to receive a second seismic node based on the determined position of the second node. At block 1010, the method includes deploying the cable with the second attached node into the water. This process is repeated until the desired number of seismic nodes has been deployed into the water. In some embodiments, the rate of deployment can be varied and/or stopped as needed and is controlled by a master control system that is integrated with the primary components of the node deployment system and overboard system. In some embodiments, such as shown in optional block 1012, the method includes positioning overboard wheel 510 in response to a change of direction of the deployed cable for more effective cable deployment. For this step, a cable detection unit (such as cable detection wheel 522) determines the position of the deployed cable and/or node and sends those measurements to a control system that changes the position (lateral, pivot, or rotational movements) of the overboard wheel and/or cable detection wheel in response to movement of the cable detection wheel and/or measurements of the cable positions.

Figure 11:
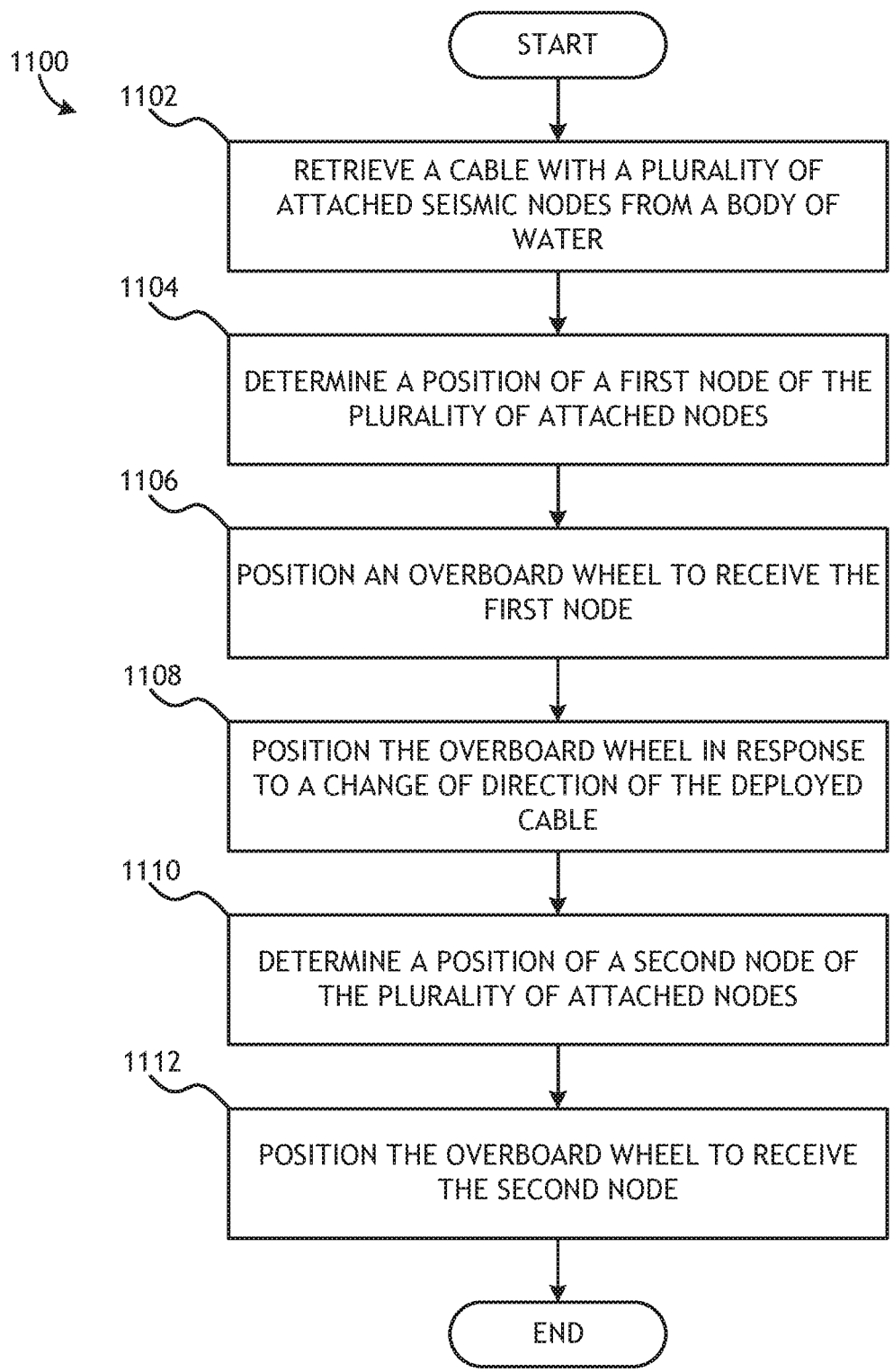
FIG. 11 illustrates one embodiment of a method of retrieving a plurality of seismic nodes coupled to a deployment line.

The retrieval operation is substantially equivalent to the deployment operation and is generally performed in a reverse manner as to the deployment method. FIG. 11 illustrates one embodiment of a method 1100 for retrieving a cable with a plurality of attached nodes onto a marine vessel from a body of water. In an embodiment, the method starts at block 1102 by retrieving a length of a deployment line 108 with a plurality of attached nodes from a body of water onto a marine vessel. In one embodiment a winch system begins retrieval of the deployed cable 108 with the coupled nodes. At block 1104, the method includes determining a position of a first seismic node prior to its passing over the overboard wheel. In one embodiment, one or more outboard and/or inboard node detection devices located at one or more locations in the deployment system (which may or may not be located in the overboard system) determines and/or calculates a position of the node. At block 1106, the method includes positioning overboard wheel 510 to receive the first node. In one embodiment, the determined node position is used by a control system to rotate overboard wheel 510 into a position to receive the node in pocket 618 as the cable passes over overboard wheel 510. The cable and attached node is routed through the overboard container through a cleaning station and then passed through the node installation container 324 for detachment, removal, and/or decoupling of the node from the rope. In some embodiments, overboard wheel 510 is actively rotated (e.g., powered) to match the recovery speed of the cable. At optional block 1108, the method includes positioning overboard wheel 510 in response to a change of direction of the deployed cable as the cable is further retrieved. Cable detection system 520 and/or cable detection wheel 522 may move with the deployed cable as it is being retrieved. Based on the position of cable detection wheel 522 the position of overboard wheel 510 may be varied to more effectively retrieve the cable and prevent the cable from falling off overboard wheel 510. At block 1110, the method includes determining a position of a second node prior to its passing over the overboard wheel. At block 1112, the method includes positioning overboard wheel 510 to receive a second node based on a determined position of the second node. This process is repeated until all of the nodes are recovered and detached from the cable and the entire cable is retrieved.

Many other variations in the overall node deployment configuration, overboard system, and arrangement of node locks and/or direct attachment mechanisms are possible within the scope of the invention. For example, while many of the disclosed embodiments discuss the deployment and retrieval of a cable with a plurality of attached nodes, other seismic devices or equipment, such as transponders and weights, may be directly attached to the node and deployed to and/or retrieved from the water by the overboard system in a similar manner as to the deployment and retrieval of the nodes. In other words, the disclosed overboard system can be used for the deployment of a variety of cables, seismic cables, and seismic devices. Further, the described overboard wheel and/or cable detection wheel may be used with a deployment system that is not contained within containers and/or does not utilize autonomous seismic nodes directly attached to a cable via one or more node locks. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A system for deploying a plurality of autonomous seismic nodes from a marine vessel, comprising:
    an overboard wheel that at least partially extends off a marine vessel, wherein the overboard wheel is configured to deploy a deployment line coupled to a plurality of autonomous seismic nodes into a body of water, wherein the overboard wheel is powered to change its position during deployment of the plurality of autonomous seismic nodes, wherein each of the plurality of autonomous seismic nodes comprises at least one seismic sensor, at least one data recording unit, and at least one clock,
    wherein the plurality of autonomous seismic nodes are configured to be attached to the deployment line before passing over the overboard wheel; and
    a control system that comprises a plurality of sensors configured to detect at least one of an orientation, position, or speed of the deployment line.

2. The system of claim 1, wherein the width of the overboard wheel is at least the width of the autonomous seismic node.

3. The system of claim 1, wherein the overboard wheel comprises one or more openings configured to receive one of the plurality of autonomous seismic nodes as the node passes along the overboard wheel.

4. The system of claim 3, wherein the one or more openings protects the autonomous seismic node from damage from the overboard wheel during deployment.

5. The system of claim 1, further comprising a cable detection system coupled to the overboard wheel.

6. The system of claim 1, further comprising an autonomous seismic node detection system coupled to the overboard wheel.

7. The system of claim 1, wherein the overboard wheel is configured to change its position in response to a position of one of the plurality of autonomous seismic nodes.

8. The system of claim 1, wherein the overboard wheel is configured to change its position in response to movement of the deployed deployment line.

9. The system of claim 1, further comprising a cable detection system configured to detect a change of position of the deployed deployment line, wherein the cable detection system comprises a plurality of sensors configured to detect said change of position.

10. The system of claim 1, further comprising one or more cable detection sensors configured to detect a change of position of the deployed deployment line.

11. The system of claim 1, further comprising one or more node detection sensors configured to detect a position of the plurality of autonomous seismic nodes.

12. The system of claim 1, wherein the control system is configured to detect the position and speed of the deployment line.

13. The system of claim 1, wherein the control system is configured to detect a position of the plurality of autonomous seismic nodes, wherein the overboard wheel is configured to rotate its position based upon the detected position.

14. The system of claim 1, wherein the overboard wheel is configured to change its position in response to a change of position of the deployment line.

15. The system of claim 1, wherein the overboard wheel is configured to change its position in response to a detected position of one of the plurality of autonomous seismic nodes.

16. The system of claim 1, further comprising a node installation system on a back deck of the marine vessel that is configured to attach the plurality of autonomous seismic nodes to the deployment line, wherein the deployment line is coupled to the node installation system and the overboard wheel.

17. A method comprising:
    deploying a deployment line from a marine vessel,
    attaching a plurality of autonomous seismic nodes to the deployment line, wherein the plurality of autonomous seismic nodes are configured to be attached to the deployment line;
    deploying the deployment line with the attached plurality of autonomous seismic nodes across a powered overboard wheel;
    automatically positioning the overboard wheel to receive a first node of the plurality of autonomous seismic nodes;
    deploying the first node into a body of water; and automatically positioning the overboard wheel based on movement of the deployed deployment line.

18. The method of claim 17, further comprising automatically detecting the position of the first node on the deployment line and automatically rotating the overboard wheel into a position to receive the first node in an opening of the overboard wheel based on the detected position.

19. The method of claim 17, further comprising automatically positioning the overboard wheel based on a change of direction of the deployment line.

20. A system for deploying a plurality of seismic nodes from a marine vessel, comprising:
an overboard wheel that at least partially extends off a marine vessel, wherein the overboard wheel is configured to deploy a deployment line coupled to a plurality of seismic nodes into a body of water, wherein the overboard wheel is powered to change its position during deployment of the plurality of seismic nodes; and
a cable detection system coupled to the overboard wheel.

21. The system of claim 20, wherein the overboard wheel is configured to change its position in response to a measurement by the cable detection system.

22. The system of claim 20, wherein the cable detection system is configured to detect a change of position of the deployed deployment line.

23. The system of claim 20, wherein the cable detection system comprises one or more sensors configured to measure at least one of the orientation, position, and speed of the deployment line.

24. The system of claim 20, wherein the overboard wheel is configured to change its position in response to movement of the deployed deployment line.

25. The system of claim 20, wherein the cable detection system is configured to monitor an angle of the deployed deployment line.

26. The system of claim 25, wherein the angle comprises a vertical angle and an horizontal angle of the deployment line.

27. The system of claim 20, wherein the plurality of seismic nodes comprises a plurality of autonomous seismic nodes, wherein each autonomous seismic node comprises at least one seismic sensor, at least one data recording unit, and at least one clock.

28. The system of claim 20, wherein the plurality of seismic nodes comprises a seismic cable.

29. A system for deploying a plurality of seismic nodes from a marine vessel, comprising:
an overboard wheel that at least partially extends off a marine vessel, wherein the overboard wheel is configured to deploy a deployment line coupled to a plurality of seismic nodes into a body of water, wherein the overboard wheel is powered to change its position during deployment of the plurality of seismic nodes; and
a node detection system coupled to the overboard wheel.

30. The system of claim 29, wherein the node detection system comprises one or more sensors configured to detect a position of each of the plurality of seismic nodes.

31. The system of claim 29, wherein the overboard wheel is configured to change its position in response to a detected position of each of the plurality of seismic nodes.

32. The system of claim 29, wherein the overboard wheel is configured to automatically rotate its position to receive each of the plurality of seismic nodes.

33. The system of claim 29, further comprising a cable detection system configured to detect a change of position of the deployed deployment line.

34. A system for deploying a plurality of seismic nodes from a marine vessel, comprising:
an overboard wheel that at least partially extends off a marine vessel, wherein the overboard wheel is configured to deploy a deployment line coupled to a plurality of seismic nodes into a body of water, wherein the overboard wheel is powered to change its position during deployment of the plurality of seismic nodes; and
a control system coupled to the overboard wheel that comprises one or more sensors configured to detect a change of position of the deployed deployment line or a position of each of the plurality of seismic nodes.

35. The system of claim 34, wherein the overboard wheel is configured to change its position in response to measurements by the control system.

36. The system of claim 35, wherein the change of position is in the horizontal plane or vertical plane.

37. The system of claim 35, wherein the change of position is a rotation of the overboard wheel.

38. The system of claim 34, wherein the control system comprises at least one sensor configured to detect at least one of the orientation, position, and speed of the deployment line.

* * * * *